US011880215B2

(12) United States Patent
Zhao et al.

(10) Patent No.: US 11,880,215 B2
(45) Date of Patent: Jan. 23, 2024

(54) DIGITAL COMPARATOR FOR A LOW DROPOUT (LDO) REGULATOR

(71) Applicant: AGENCY FOR SCIENCE, TECHNOLOGY AND RESEARCH, Singapore (SG)

(72) Inventors: Jianming Zhao, Singapore (SG); Yuan Gao, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 223 days.

(21) Appl. No.: 17/599,345

(22) PCT Filed: Mar. 27, 2020

(86) PCT No.: PCT/SG2020/050174
§ 371 (c)(1),
(2) Date: Sep. 28, 2021

(87) PCT Pub. No.: WO2020/204820
PCT Pub. Date: Oct. 8, 2020

(65) Prior Publication Data
US 2022/0163988 A1 May 26, 2022

(30) Foreign Application Priority Data
Mar. 29, 2019 (SG) ........................... 10201902838Y

(51) Int. Cl.
*G05F 1/575* (2006.01)
*G05F 1/563* (2006.01)
*G05F 1/595* (2006.01)

(52) U.S. Cl.
CPC .............. *G05F 1/575* (2013.01); *G05F 1/563* (2013.01); *G05F 1/595* (2013.01)

(58) Field of Classification Search
CPC ........... G05F 1/563; G05F 1/575; G05F 1/595
See application file for complete search history.

(56) References Cited

U.S. PATENT DOCUMENTS

2014/0254734 A1* 9/2014 Abdelmoneum ..... H04L 7/0331 375/376
2015/0241890 A1* 8/2015 Raychowdhury ......... G06F 1/26 713/300

(Continued)

OTHER PUBLICATIONS

International Search Report directed to related International Application No. PCT/SG2020/050174, dated Sep. 17, 2020.

(Continued)

*Primary Examiner* — Jue Zhang
(74) *Attorney, Agent, or Firm* — Sterne, Kessler, Goldstein & Fox P.L.L.C.

(57) ABSTRACT

This disclosure relates to a digital comparator coupled to a pair of pull-up resistors and a pair of pull-down resistors whereby both pairs of resistors are coupled to an output terminal of a low dropout (LDO) regulator. In particular, the digital comparator comprises an edge detector module, a consecutive two-edge detector module and a consecutive three-edge detector module whereby the edge detector module is configured to receive two clock signals as inputs and after being processed by these three modules, to pull-up or pull-down the resistors at the output terminal of the LDO regulator based on the rising and falling edges of the received clock signals.

13 Claims, 15 Drawing Sheets

(56) References Cited

U.S. PATENT DOCUMENTS

| | | | |
|---|---|---|---|
| 2017/0212540 A1 | 7/2017 | Cho et al. | |
| 2018/0284823 A1* | 10/2018 | Na | G05F 1/575 |
| 2019/0064862 A1 | 2/2019 | Pan et al. | |

OTHER PUBLICATIONS

Akram M.A et al., Fast Transient Fully Standard-Cell-Based All Digital Low Dropout Regulator With 99.97% Current Efficiency. IEEE Transactions on Power Electronics, Nov. 13, 2017, vol. 33, No. 9, pp. 8011-8019.
Choi S.-W. et al., A Quasi-Digital Ultra-Fast Capacitor-Less Low-Dropout Regulator Based on Comparator Control for x8 Current Spike of PCRAM Systems. 2018 IEEE Symposium on VLSI Circuits, Jun. 22, 2018, pp. 107-108.

* cited by examiner

DIGITAL COMPARATOR FOR A LOW DROPOUT (LDO) REGULATOR

CROSS-REFERENCE TO RELATED APPLICATIONS

This application is a U.S. National Phase of International Application No. PCT/SG2020/050174, filed Mar. 27, 2020, which claims the benefit of Singapore Application No. SG10201902838Y, filed Mar. 29, 2019, both of which are hereby incorporated by reference herein in their entireties.

FIELD OF THE INVENTION

This invention relates to a digital comparator coupled to a pair of pull-up resistors and a pair of pull-down resistors whereby both pairs of resistors are coupled to an output terminal of a low dropout (LDO) regulator. In particular, the digital comparator comprises an edge detector module, a consecutive two-edge detector module and a consecutive three-edge detector module whereby the edge detector module is configured to receive two clock signals as inputs and after being processed by these three modules, to pull-up or pull-down the resistors at the output terminal of the LDO regulator based on the rising and falling edges of the received clock signals.

SUMMARY OF THE PRIOR ART

Low dropout (LDO) regulators are voltage regulators that may be used to make high speed adjustments to the power supplied to a load of a circuit or system. A conventional analogue LDO regulator comprises an amplifier that is used to drive a gate terminal of an output transistor which is powered by an input power supply. The output transistor is then configured to provide a regulated output voltage to a load. The regulated output voltage is compared with a reference voltage by the amplifier and it is this negative feedback that sets the voltage at the gate terminal so that the output voltage is regulated.

In particular, ultra-low power output-capacitorless LDO regulators are widely used in system-on-chip (SoC) designs as SoC designs typically have power sources with energy density limitations. As such, those skilled in the art are investigating the use of digital LDO regulators in SoC designs as these digital LDO regulators are compatible with scalable processes and voltage supplies. The downside is that there is an inherent trade-off between power consumption and transient response when this approach is adopted. In order to address this and to achieve better transient responses, hybrid controlled LDOs were proposed by those skilled in the art.

However, in the designs proposed so far, a large coupling capacitor or internal charge pumps are required to be used and this severely narrows the voltage supply range of the hybrid controlled LDO. Other techniques such as multiple-clock or dynamic-clock schemes have also been proposed, but were not successful as the designs comprise other types of power-hungry supportive blocks that cause the overall power performance to degrade significantly.

Apart from this, as SoC technology progresses into sub-threshold design processes, the noise level of digital LDOs become troublesome and affect the load circuit's operational reliability due to the limited dynamic range of its load. To achieve low noise performance, dynamic dead zone control and analogue type control methods such as PWM control method and switched-capacitor resistance methods have been proposed. However, the dynamic dead zone design involves a long settling time in its transient response and this is mainly attributed to the dead zone tuning period. Hence, it can be said that while the noise performance of LDOs may be improved upon, this results in a compromise on the maximum current range of its load.

For the above reasons, those skilled in the art are constantly striving to come up with a digital comparator that has ultra-low power consumption and fast transient response times.

SUMMARY OF THE INVENTION

The above and other problems are solved and an advance in the art is made by circuits and apparatuses provided by embodiments in accordance with the invention.

A first advantage of embodiments of circuits and apparatuses in accordance with the invention is that the digital comparator consumes ultra-low power as compared to existing digital comparators.

A second advantage of embodiments of circuits and apparatuses in accordance with the invention is that an LDO regulator comprising the digital comparator is able to achieve a large load dynamic range.

A third advantage of embodiments of circuits and apparatuses in accordance with the invention is that an LDO regulator comprising the digital comparator utilizes a small on-chip capacitor thereby reducing the overall size of the SoC design and increases the range of the voltage supply.

The above advantages are provided by embodiments of a system in accordance with the invention operating in the following manner.

According to a first aspect of the invention, a digital comparator coupled to a pair of pull-up resistors and a pair of pull-down resistors whereby both pairs of resistors are coupled to a gate terminal of an output stage is disclosed, the digital comparator comprising: a single-edge detector stage configured to detect a first rising edge in a received first digital signal, and to detect a first falling edge in a received second digital signal, whereby when the first rising edge is detected and when the first falling edge is not simultaneously detected, a detector node is set to a low voltage level, and when the first falling edge is detected, the detector node is set to a high voltage level; a consecutive two-edge detector stage coupled to the single-edge detector stage, the consecutive two-edge detector stage configured to detect the voltage level of the detector node, a consecutive second rising edge in the received first digital signal and a consecutive second falling edge in the received second digital signal, whereby when the consecutive second rising edge is detected and when the voltage level of the detector node is simultaneously detected to be at a low voltage level, the consecutive two-edge detector stage causes one of the pair of pull-up resistors to pull up a voltage at the gate terminal, and when the consecutive second falling edge is detected and when the voltage level of the detector node is simultaneously detected to be at a high voltage level, the consecutive two-edge detector stage causes one of the pair of pull-down resistors to pull down the voltage at the gate terminal; a consecutive three-edge detector stage coupled to the single-edge and the consecutive two-edge detector stages, the consecutive three-edge detector stage configured to detect the voltage level of the detector node, a consecutive third rising edge in the received first digital signal and a consecutive third falling edge in the received second digital signal, whereby when the consecutive third rising edge is detected and when the voltage level of the detector node is simultaneously detected to be at a low voltage level, the consecutive three-edge detector stage causes the other one of the pair of pull-up resistors to pull up the voltage at the gate terminal, and when the consecutive third falling edge is detected and when the voltage level of the detector node is simultaneously detected to be at a high voltage level, the consecutive three-edge detector stage causes the other one of the pair of pull-down resistors to pull down the voltage at the gate terminal.

With reference to the first aspect, when the consecutive two-edge detector stage and the consecutive three-edge detector stage detects a high voltage level at the detector node, the consecutive two-edge and three-edge detector stages cause the pair of pull-up resistors to be disabled.

With reference to the first aspect, when the consecutive two-edge detector stage and the consecutive three-edge detector stage detects a low voltage level at the detector node, the consecutive two-edge and three-edge detector stages cause the pair of pull-down resistors to be disabled.

With reference to the first aspect, wherein level shifters are provided at inputs of the single-edge detector stage, at outputs of the consecutive two-edge detector and at outputs of the consecutive three-edge detector stage.

With reference to the first aspect, a digital low-dropout circuit having the digital comparator according to the first aspect is disclosed, the digital low-dropout circuit comprising: a first inverter ring oscillator that is controllable by an output voltage of the output stage to generate the first digital signal; and a second inverter ring oscillator that is controllable by a reference voltage to generate the second digital signal.

With reference to the first aspect, the digital low-dropout circuit comprises a Miller capacitor that is provided between the gate terminal and an output node of the output stage.

With reference to the first aspect, the digital low-dropout circuit comprises a feed-forward capacitor that is provided between an output node of the output stage and the input of the second inverter ring oscillator.

With reference to the first aspect, a sub-digital comparator is provided to control a pseudo-voltage of the digital comparator.

With reference to the first aspect, the sub-digital comparator comprises: a differential amplifier having a first input coupled to a voltage divider and a second input coupled to a third inverter ring oscillator that is controllable by the reference voltage.

According to a second aspect of the invention, a method of controlling a digital comparator that is coupled to a pair of pull-up resistors and a pair of pull-down resistors whereby both pairs of resistors are coupled to a gate terminal of an output stage is disclosed, the method comprising the steps of: detecting, using a single-edge detector stage, a first rising edge in a received first digital signal, and a first falling edge in a received second digital signal, whereby when the first rising edge is detected and when the first falling edge is not simultaneously detected, setting a detector node to a low voltage level, and when the first falling edge is detected, setting the detector node to a high voltage level; detecting, using a consecutive two-edge detector stage coupled to the single-edge detector stage, the voltage level of the detector node, a consecutive second rising edge in the received first digital signal and a consecutive second falling edge in the received second digital signal, whereby when the consecutive second rising edge is detected and when the voltage level of the detector node is simultaneously detected to be at a low voltage level, causing one of the pair of pull-up resistors to pull up a voltage at the gate terminal, and when the consecutive second falling edge is detected and when the voltage level of the detector node is simultaneously detected to be at a high voltage level, causing one of the pair of pull-down resistors to pull down the voltage at the gate terminal; detecting, a consecutive three-edge detector stage coupled to the single-edge and the consecutive two-edge detector stages, the voltage level of the detector node, a consecutive third rising edge in the received first digital signal and a consecutive third falling edge in the received second digital signal, whereby when the consecutive third rising edge is detected and when the voltage level of the detector node is simultaneously detected to be at a low voltage level, causing the other one of the pair of pull-up resistors to pull up the voltage at the gate terminal, and when the consecutive third falling edge is detected and when the voltage level of the detector node is simultaneously detected to be at a high voltage level, causing the other one of the pair of pull-down resistors to pull down the voltage at the gate terminal.

With respect to the second aspect, when the consecutive two-edge detector stage and the consecutive three-edge detector stage detects a high voltage level at the detector node, the method comprises the step of causing the pair of pull-up resistors to be disabled.

With respect to the second aspect, when the consecutive two-edge detector stage and the consecutive three-edge detector stage detects a low voltage level at the detector node, the method comprises the step of causing the pair of pull-down resistors to be disabled.

With respect to the second aspect, level shifters are provided at inputs of the single-edge detector stage and at outputs of the consecutive three-edge detector stage.

BRIEF DESCRIPTION OF THE DRAWINGS

The above advantages and features in accordance with this invention are described in the following detailed description and are shown in the following drawings.

DETAILED DESCRIPTION

This invention relates to a digital comparator coupled to a pair of pull-up resistors and a pair of pull-down resistors whereby both pairs of resistors are coupled to an output terminal of a low dropout (LDO) regulator. In particular, the digital frequency comparator comprises an edge detector module, a consecutive two-edge detector module and a consecutive three-edge detector module whereby the edge detector module is configured to receive two clock signals as inputs. These received signals, after being processed by these three modules, then cause the respective resistors of the LDO regulator to be pulled-up or pulled-down based on the rising and falling edges of the received clock signals.

Figure 1:
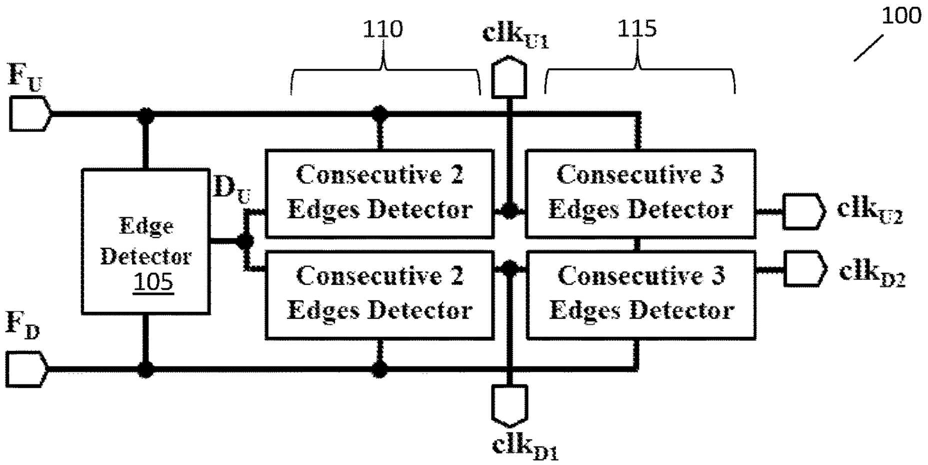
FIG. 1 illustrating a block diagram of modules contained within a digital frequency comparator in accordance with embodiments of the invention.

A block diagram of a digital comparator in accordance with embodiments of the invention is illustrated in FIG. 1. Digital comparator 100 comprises an edge detector stage 105, a consecutive two-edge detector stage 110 and a consecutive three-edge detector stage 115. Edge detector stage 105 is configured to receive a first digital signal $F_U$ and a second digital signal $F_D$ whereby in embodiments of the invention, edge detector stage 105 is further configured to detect a rising edge in the first digital signal $F_U$ and to detect a falling edge in the second digital signal $F_D$. When rising or falling edges are detected in either or both signals, edge detector stage 105 then causes a voltage level at its output node $D_U$ to change accordingly.

The first and second digital signals $F_U$ and $F_D$, and the output node $D_U$ are coupled to the input of two-edge detector stage 110 such that the two-edge detector stage 110 is configured to cause voltage levels at its output nodes $clk_{U1}$ and $clk_{D1}$ to change accordingly when another consecutive rising edge in the first digital signal $F_U$ is detected and/or when another consecutive falling edge in the second digital signal $F_D$ is detected.

The first and second digital signals $F_U$ and $F_D$, and the output node $D_U$ are also coupled to the input of three-edge detector stage 115 such that the three-edge detector stage 115 is configured to cause voltage levels at its output nodes $clk_{U2}$ and $clk_{D2}$ to change accordingly when a third consecutive rising edge in the first digital signal $F_U$ is detected and/or when a third consecutive falling edge in the second digital signal $F_D$ is detected.

In accordance with embodiments of the invention, but not limited to this embodiment, the outputs from the two-edge detector stage 110 and the three-edge detector stage 115 may then be coupled to a pair of pull-up and to a pair pull-down resistors accordingly to control the "pull" timings of these resistors.

Figure 2:
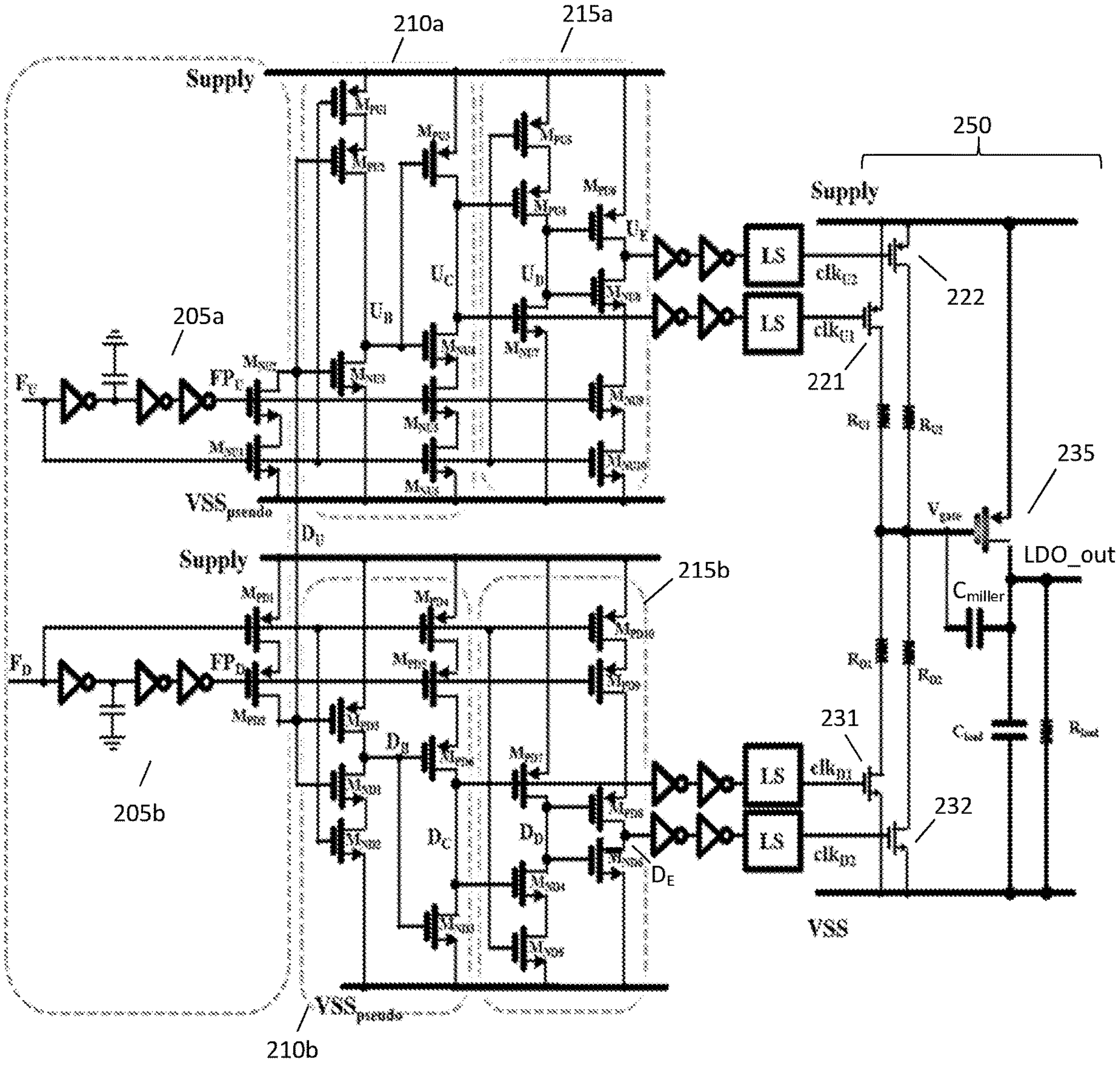
FIG. 2 illustrating circuit diagrams of modules contained within a digital frequency comparator in accordance with embodiments of the invention.

FIG. 2 illustrates the circuit diagrams of the edge detector stage 105, the consecutive two-edge detector stage 110 and the consecutive three-edge detector stage 115 whereby the outputs $U_C$, $U_E$, $D_C$ and $D_E$ of digital comparator 100 are provided to output stage 250 after the output signals $U_C$, $U_E$, $D_C$ and $D_E$ have been delayed and level-shifted to appropriate levels $clk_{U1}$, $clk_{U2}$, $clk_{D1}$ and $clk_{D2}$ to control switches 221, 222, 231 and 232 respectively. Transistors in each of these stages are coupled to either voltage supply $V_{supply}$ or pseudo-voltage $VSS_{pseudo}$ whereby the voltage level of $VSS_{pseudo}$ is understood to be lower than the voltage level of $V_{supply}$ whereby in embodiments of the invention, the voltage drop between $VSS_{pseudo}$ and $V_{supply}$ is about 0.8 Volts.

When switches 221 and 222 switch on, they cause pull-up resistors $R_{U1}$ and $R_{U2}$ to pull the gate voltage $V_{gate}$ of power amplifier 235 up, and when switches 231 and 232 switch on, they cause pull-down resistors $R_{D1}$ and $R_{D2}$ to pull the gate voltage $V_{gate}$ of power amplifier 235 down. By doing this, the digital comparator 100 is able to control the output voltage at the LDO_out node by controlling the timings of pull-up resistors $R_{U1}$ and $R_{U2}$ through switches 221 and 22 and the timings of pull-down resistors $R_{D1}$ and $R_{D2}$ through switches 231 and 232.

As illustrated in FIG. 2, edge detector stage 105 comprises sub-circuit 205*a* for receiving the first digital signal $F_U$ and sub-circuit 205*b* for receiving the second digital signal $F_D$.

In embodiments of the invention, sub-circuits 205*a*, 210*a* and 215*a* were configured to detect rising edges in the first digital signal $F_U$. As such, sub-circuit 205*a* comprises a plurality of logic NOT gates (or inverters) and at least two N-type Metal-Oxide-Semiconductor (NMOS) transistors, $M_{NU1}$ and $M_{NU2}$, that are connected in series whereby a source terminal of NMOS transistor $M_{NU1}$ is connected to a supply voltage $VSS_{pseudo}$, and a drain terminal of NMOS transistor $M_{NU2}$ is connected to a detector node $D_U$. The logic NOT gates are configured such that when the first digital signal $F_U$ is provided to sub-circuit 205*a*, the first digital signal is delayed and inverted by the NOT gates thereby producing delayed-first digital signal $FP_U$. As can be seen, sub-circuit 205*a* is configured such that the first digital signal $F_U$ is provided directly to NMOS transistor $M_{NU1}$ while the delayed-first digital signal $FP_U$ is provided to NMOS transistor $M_{NU2}$.

Consecutive two-edge detector stage 110 comprises sub-circuit 210*a* for receiving the first digital signal $F_U$, the delayed-first digital signal $FP_U$ and the detector node voltage $D_U$. In particular, as illustrated in FIG. 2, sub-circuit 210*a* comprises at least three NMOS transistors, $M_{NU4}$, $M_{NU5}$ and $M_{NU6}$ that are connected in series whereby the output node $U_C$ is provided at the drain terminal of the NMOS transistor $M_{NU4}$, at least two P-type Metal-Oxide-Semiconductor (PMOS) transistors, $M_{PU1}$ and $M_{PU2}$, that are connected in series, a NMOS transistor $M_{NU3}$ whose gate is switched by the voltage at the detector node $D_U$ and has as its drain terminal output node $U_B$ and a PMOS transistor $M_{PU3}$ whose gate is coupled to output node $U_B$ and drain is coupled to output node $U_C$. As can be seen, sub-circuit 210*a* is configured such that the first digital signal $F_U$ is provided directly to NMOS transistor $M_{NU6}$ and PMOS transistor $M_{PU1}$, the delayed-first digital signal $FP_U$ is provided to NMOS transistor $M_{NU5}$, and the voltage at the detector node $D_U$ is provided to PMOS transistor $M_{PU2}$ and NMOS transistor $M_{NU3}$.

As for consecutive three-edge detector stage 115, this stage comprises sub-circuit 215*a* for receiving first digital signal $F_U$, the delayed-first digital signal $FP_U$ and the voltage at node $U_C$. In particular, as illustrated in FIG. 2, sub-circuit 215*a* comprises at least two NMOS transistors, $M_{NU9}$ and $M_{NU10}$ that are connected in series, at least two PMOS transistors, $M_{PU4}$ and $M_{PU5}$, that are connected in series, NMOS transistors $M_{NU7}$ and $M_{NU8}$ whereby the drain terminal of the NMOS transistor $M_{NU7}$ (whose gate is switched by the voltage at output node $U_C$) has as its drain terminal output node $U_D$ and the drain terminal of the NMOS transistor $M_{NU8}$ (whose gate is switched by the voltage at output node $U_D$) has as its drain terminal output node $U_E$. As can be seen, sub-circuit 215*a* is configured such that the first digital signal $F_U$ is provided directly to NMOS transistor $M_{NU1}o$ and PMOS transistor $M_{PU5}$, the delayed-first digital signal $FP_U$ is provided to NMOS transistor $M_{NU9}$, and the voltage at the output node $U_C$ is provided to PMOS transistor $M_{PU4}$ and NMOS transistor $M_{NU7}$.

Hence, it can be said that when a first digital signal $F_U$ is provided to sub-circuits 205*a*, 210*a* and 215*a*, the output from these sub-circuits may be obtained from output nodes $U_E$ and $U_C$.

Sub-circuits 205*b*, 210*b* and 215*b* comprise of an almost similar configuration as that of sub-circuits 205*a*, 210*a* and 215*a* respectively. However, as sub-circuits 205*b*, 210*b* and 215*b* were configured to detect a falling edge in the second digital signal $F_D$, the type of the transistors used in 205*b*, 210*b* and 215*b* differs from that of sub-circuits 205*a*, 210*a* and 215*a*.

In particular, sub-circuit 205*b* similarly comprises a plurality of logic NOT gates (or inverters) and at least two PMOS transistors, $M_{PD1}$ and $M_{PD2}$, that are connected in series whereby a source terminal of PMOS transistor $M_{PD1}$ is connected to a supply voltage $V_{Supply}$, and a drain terminal of PMOS transistor $M_{PD2}$ is connected to the detector node $D_U$. The logic NOT gates are configured such that when the second digital signal $F_D$ is provided to sub-circuit 205*b*, the second digital signal is delayed and inverted by the NOT gates thereby producing delayed-second digital signal $FP_D$. As can be seen, sub-circuit 205*b* is configured such that the second digital signal $F_D$ is provided directly to PMOS transistor $M_{PD1}$ while the delayed-second digital signal $FP_D$ is provided to PMOS transistor $M_{PD2}$.

Sub-circuit 210*b* is then configured to receive the second digital signal $F_D$, the delayed-second digital signal $FP_D$ and the detector node voltage $D_U$. In particular, as illustrated in FIG. 2, sub-circuit 210*b* comprises at least three PMOS transistors, $M_{PD4}$, $M_{PD5}$ and $M_{PD6}$ that are connected in series whereby the output node $D_C$ is provided at the drain terminal of the PMOS transistor $M_{PD6}$, at least two NMOS transistors, $M_{ND1}$ and $M_{ND2}$, that are connected in series, a PMOS transistor $M_{PD5}$ whose gate is switched by the voltage at the detector node $D_U$ and has as its drain terminal output node $D_B$ and a NMOS transistor $M_{ND3}$ whose gate is coupled to output node $D_B$ and drain is coupled to output node $D_C$. As can be seen, sub-circuit 210*b* is configured such that the second digital signal $F_D$ is provided directly to PMOS transistor $M_{PD4}$ and NMOS transistor $M_{ND2}$, the delayed-second digital signal $FP_D$ is provided to PMOS transistor $M_{PD5}$, and the voltage at the detector node $D_U$ is provided to PMOS transistor $M_{PD3}$ and NMOS transistor $M_{ND1}$.

As for sub-circuit 215*b*, this circuit is configured to receive second digital signal $F_D$, the delayed-second digital signal $FP_D$ and the voltage at node $D_C$. In particular, as illustrated in FIG. 2, sub-circuit 215*b* comprises at least two PMOS transistors, $M_{PD9}$ and $M_{PD10}$ that are connected in series, at least two NMOS transistors, $M_{ND4}$ and $M_{ND5}$, that are connected in series, PMOS transistors $M_{PD7}$ and $M_{PD8}$ whereby the drain terminal of the PMOS transistor $M_{PD7}$ (whose gate is switched by the voltage at output node $D_C$) has as its drain terminal output node $D_D$ and the drain terminal of the PMOS transistor $M_{PD5}$ (whose gate is switched by the voltage at output node $D_D$) has as its drain terminal output node $D_E$. As can be seen, sub-circuit 215*b* is configured such that the second digital signal $F_D$ is provided directly to PMOS transistor $M_{PD10}$ and PMOS transistor $M_{ND5}$, the delayed-second digital signal $FP_D$ is provided to PMOS transistor $M_{PD9}$, and the voltage at the output node $D_C$ is provided to NMOS transistor $M_{ND4}$ and PMOS transistor $M_{PD7}$.

Hence, it can be said that when the second digital signal $F_D$ is provided to sub-circuits 205*b*, 210*b* and 215*b*, the output from these sub-circuits may be obtained from output nodes $D_E$ and $D_C$.

Figure 3:
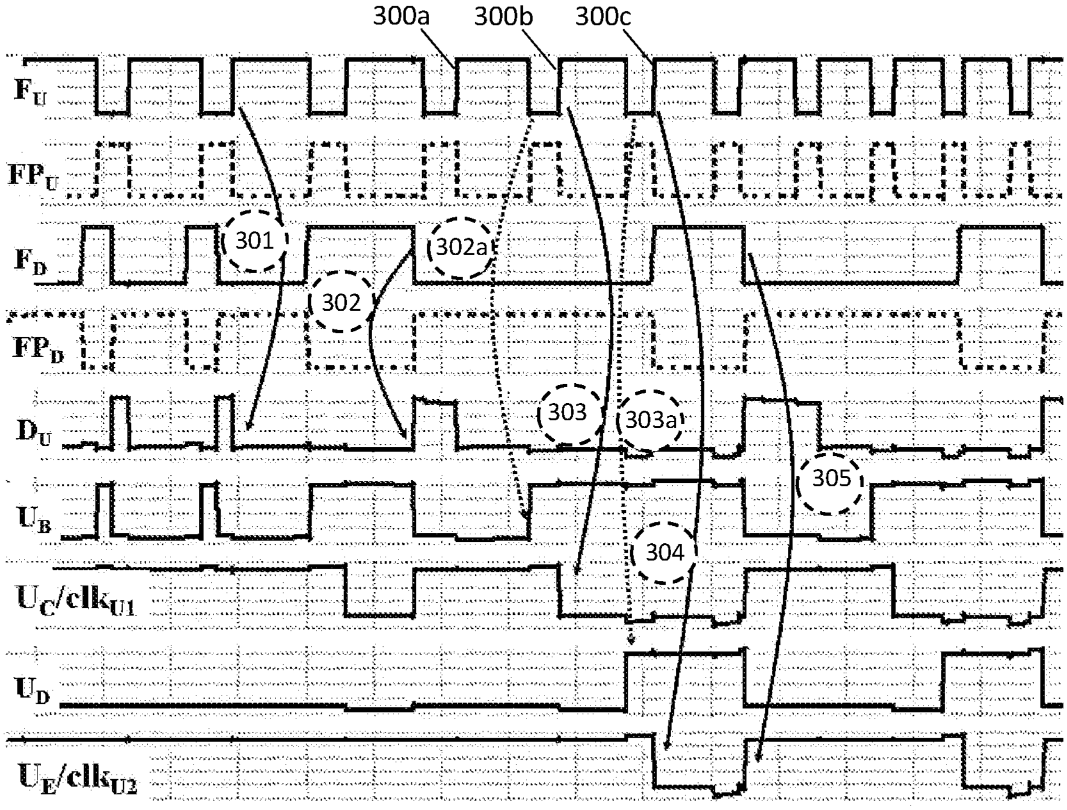
FIG. 3 illustrating a timing diagram of the digital frequency comparator illustrated in FIG. 2 in accordance with embodiments of the invention whereby the timing diagram illustrates the pulling up of a pair of pull-up resistors.

In order to better understand the detailed workings of these sub-circuits, reference is made to the timing diagrams illustrated in FIGS. 3-10. FIG. 3 illustrates the timing diagrams of sub-circuits 205*a*, 210*a* and 215*a* when first and second digital signals $F_U$ and $F_D$ are provided to sub-circuits 205*a*, 210*a* and 215*a*. In particular, this timing diagram provides an overview of the key events/steps 301-305 that occur.

Figure 4:
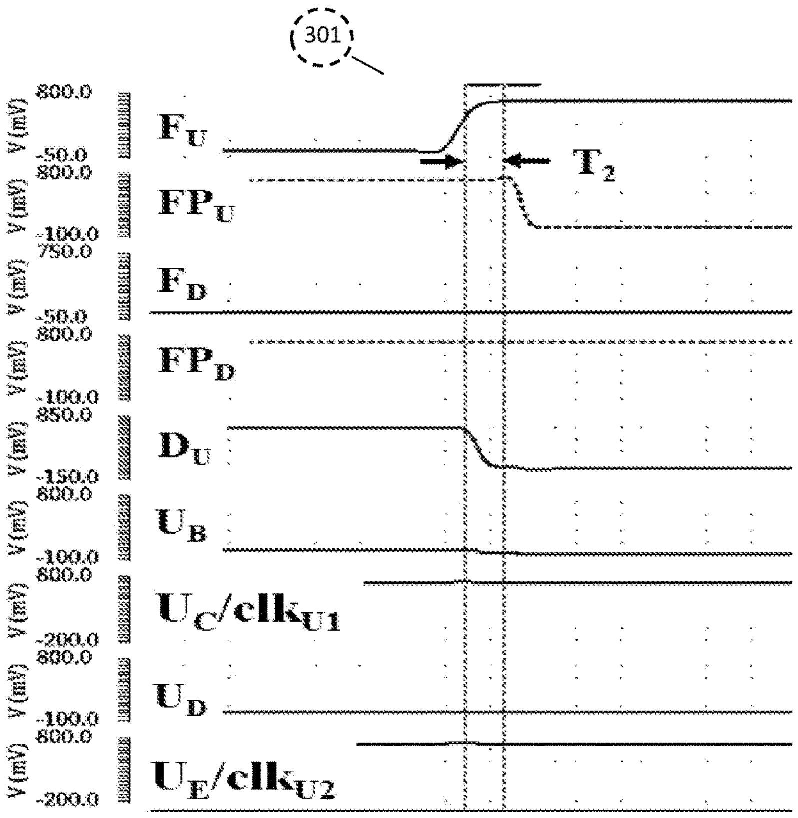
FIG. 4 illustrating a timing diagram of the digital frequency comparator illustrated in FIG. 2 at step 301 of the timing diagram in FIG. 3 in accordance with embodiments of the invention.

At step 301, as illustrated in FIG. 4, it can be seen that due to the logic NOT gates in sub-circuit 205*a*, a delay of period $T_2$ exists between the first digital signal $F_U$ and the inverted delayed-first digital signal $FP_U$. Due to this delay, after a rising edge occurs for signal $F_U$, the signal $FP_U$ only starts falling after the period $T_2$ has lapsed. During this period $T_2$, as both signals $F_U$ and $FP_U$ are "high", this causes NMOS transistors $M_{NU1}$ and $M_{NU2}$ to switch on and as the second digital signal $F_D$ is "low", this causes one of PMOS transistors $M_{PD1}$ and $M_{PD2}$ to switch off. As a result, the voltage at detector node $D_U$ is triggered to become low, i.e. the voltage at detector node $D_U$ is set to $VSS_{pseudo}$. It is useful at this stage to recap that the voltage level of $VSS_{Pseudo}$ is understood to be lower than the voltage level of $V_{supply}$ whereby in embodiments of the invention, the voltage drop between $VSS_{pseudo}$ and $V_{supply}$ is about 0.8 Volts.

Figure 5:
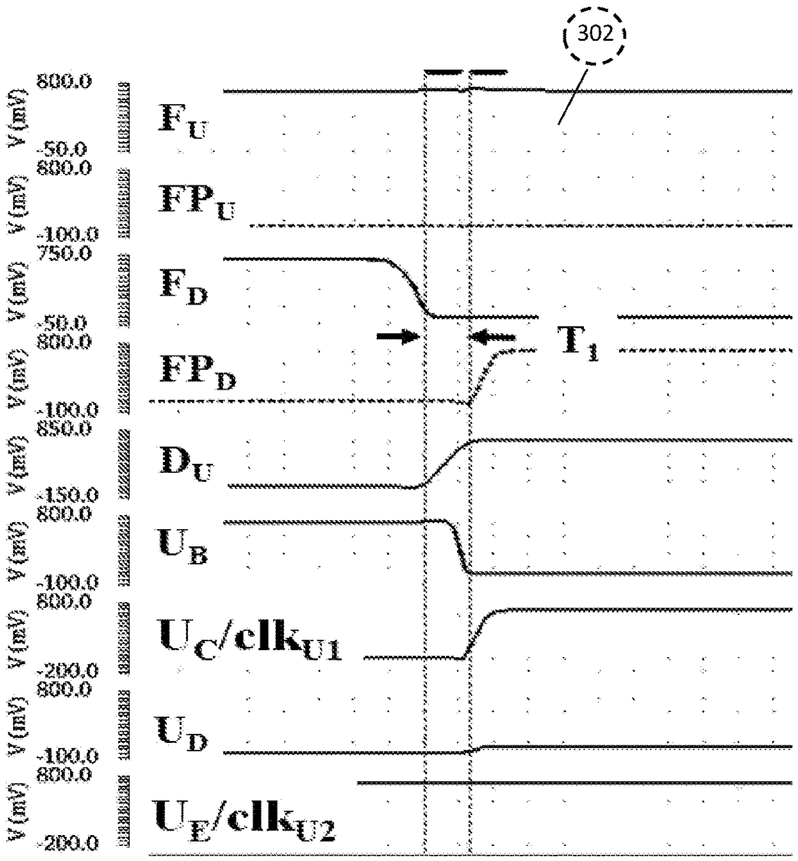
FIG. 5 illustrating a timing diagram of the digital frequency comparator illustrated in FIG. 2 at step 302 of the timing diagram in FIG. 3 in accordance with embodiments of the invention.

At step 302, as illustrated in FIG. 5, it can be seen that due to the logic NOT gates in sub-circuit 205*b*, a delay of period $T_1$ similarly exists between the second digital signal $F_D$ and the inverted delayed-first digital signal $FP_D$. Due to this delay, after a falling edge occurs for signal $F_D$, the signal $FP_D$ only starts rising after the period $T_1$ has lapsed. During this period $T_1$, as both signals $F_D$ and $FP_D$ are "low", this causes PMOS transistors $M_{PD1}$ and $M_{PD2}$ to switch on and as the first digital signal $F_U$ is "high", this causes one of NMOS transistors $M_{NU1}$ and $M_{NU2}$ to switch off. As a result, the voltage at detector node $D_U$ is triggered to become high, i.e. the voltage at detector node $D_U$ is set to $V_{supply}$.

With reference to FIG. 3, it can be seen that after step 302, the second digital signal $F_D$ does not have another falling edge until step 305. After step 302, a first rising edge 300*a* occurs at digital signal $F_U$ causing detector node $D_U$ to become low. This in turn switches PMOS transistor $M_{PU2}$ on.

Figure 6:
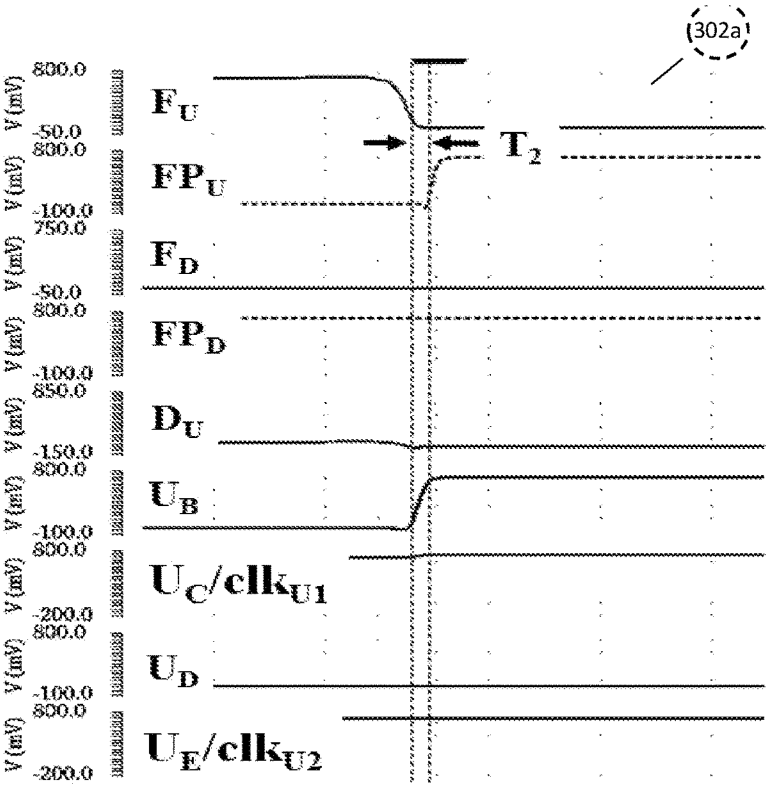
FIG. 6 illustrating a timing diagram of the digital frequency comparator illustrated in FIG. 2 at step 302*a* of the timing diagram in FIG. 3 in accordance with embodiments of the invention.

At step 302*a*, as illustrated in FIG. 6, when signal $F_U$ becomes low and when signal $FP_U$ becomes low for a period of $T_2$, this causes PMOS transistor $M_{PU1}$ to switch on thereby causing a voltage level at node $U_B$ to become high.

Figure 7:
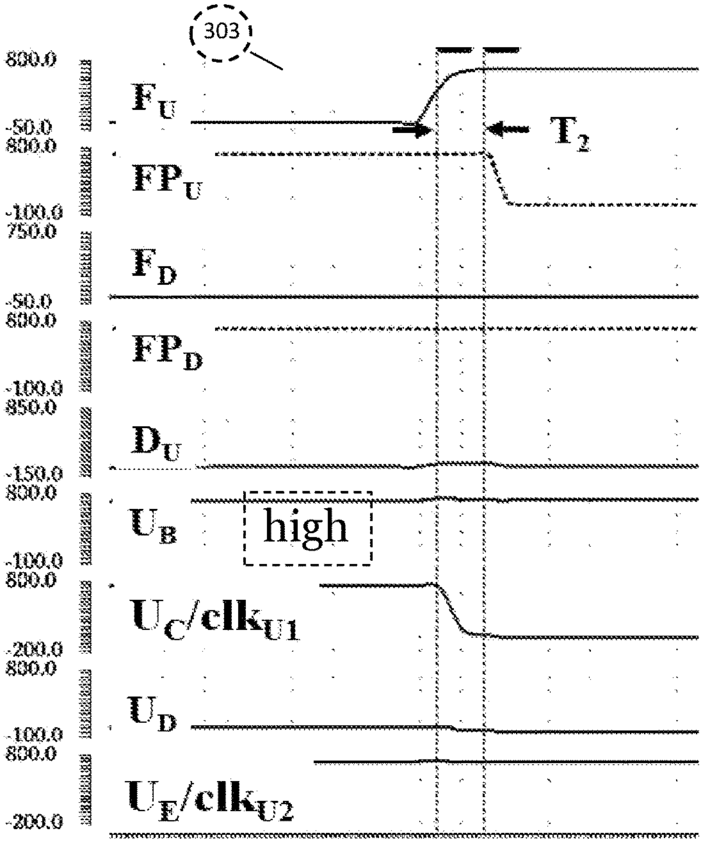
FIG. 7 illustrating a timing diagram of the digital frequency comparator illustrated in FIG. 2 at step 303 of the timing diagram in FIG. 3 in accordance with embodiments of the invention.

Subsequently, as illustrated in FIG. 7, a second rising edge 300*b* occurs for digital signal $F_U$ at step 303 whereby for a period of time $T_2$, signals $F_U$ and $FP_U$ are both high causing the voltage level at node $U_C$ to become low, which in turn after being processed by inverters and a level shifter, causes a voltage level at output node $clk_{U1}$ to become low as well.

Figure 8:
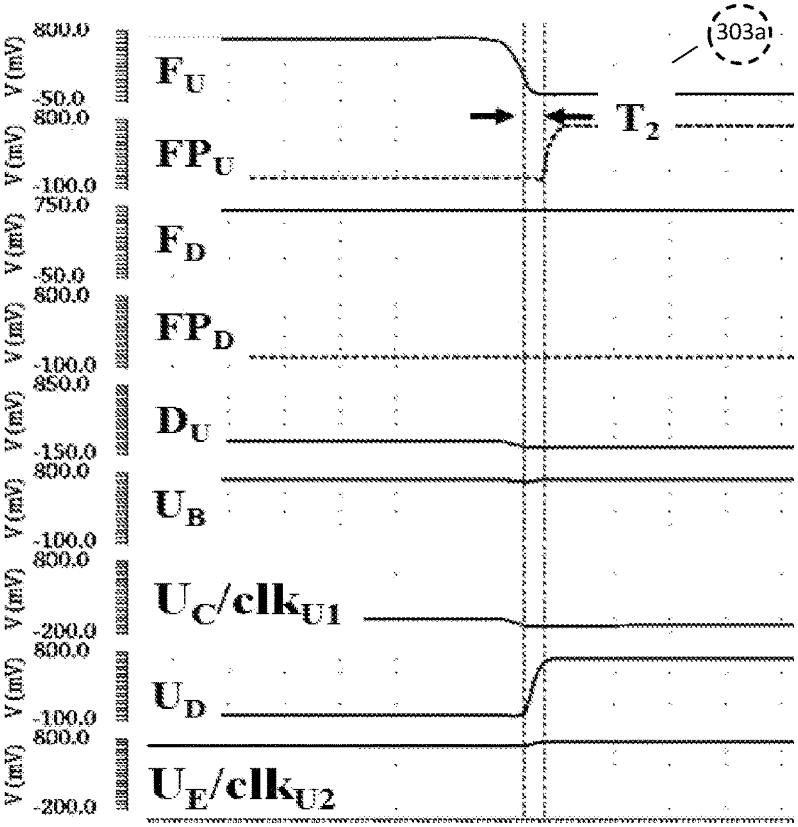
FIG. 8 illustrating a timing diagram of the digital frequency comparator illustrated in FIG. 2 at step 303*a* of the timing diagram in FIG. 3 in accordance with embodiments of the invention.

As a falling edge is not detected at the second digital signal $F_D$, when the signal $F_U$ becomes low (and signal $FP_U$ is low as well for a period of time $T_2$), this causes the voltage at node $U_D$ to become high. This takes place at step 303*a* as illustrated in FIG. 8.

Figure 9:
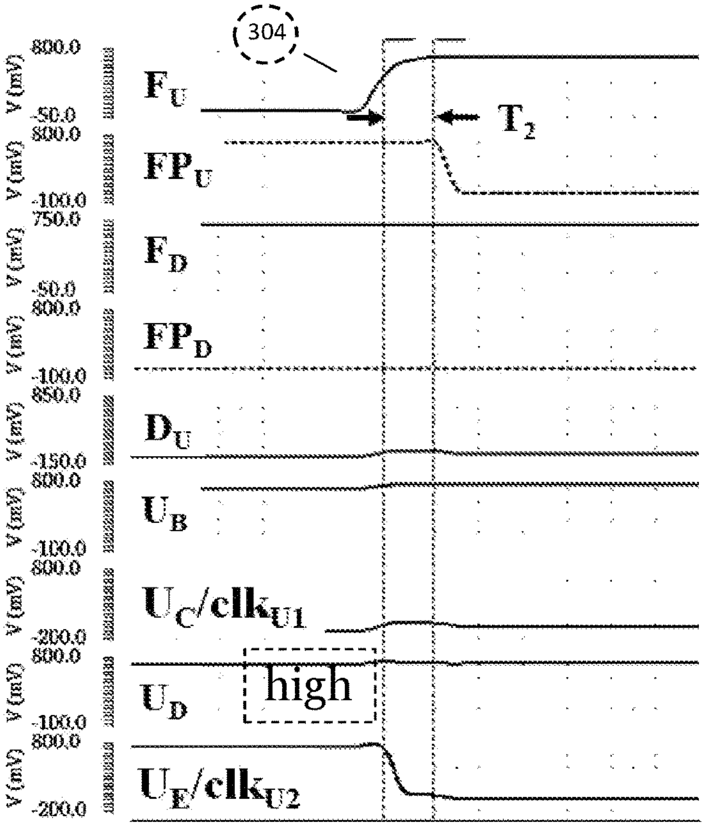
FIG. 9 illustrating a timing diagram of the digital frequency comparator illustrated in FIG. 2 at step 304 of the timing diagram in FIG. 3 in accordance with embodiments of the invention.

Subsequently, as illustrated in FIG. 9, a third rising edge 300*c* occurs for digital signal $F_U$ at step 304. This causes the voltage level at node $U_E$ to become low as NMOS transistors $M_{NU8}$, $M_{NU9}$, and $M_{NU10}$ are switched on. After the voltage level at node $U_E$ has been processed by inverters and a level shifter, this causes a voltage level at output node $clk_{U2}$ to become low as well.

Figure 10:
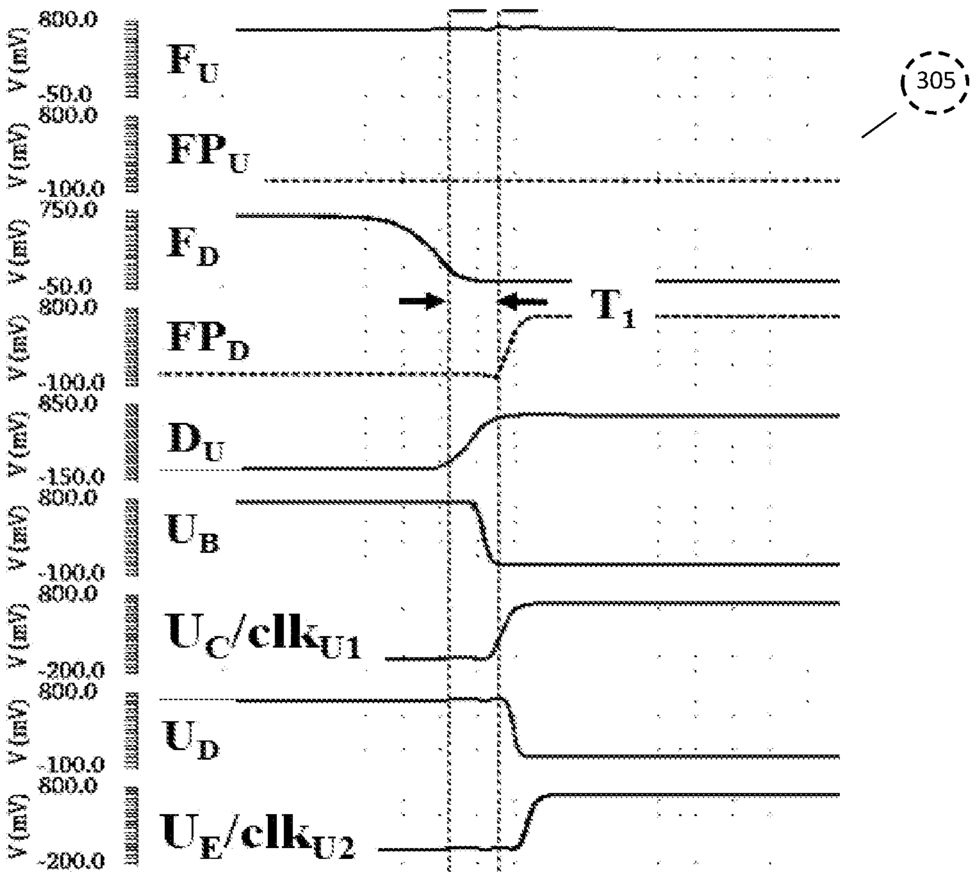
FIG. 10 illustrating a timing diagram of the digital frequency comparator illustrated in FIG. 2 at step 305 of the timing diagram in FIG. 3 in accordance with embodiments of the invention.
Figure 11:
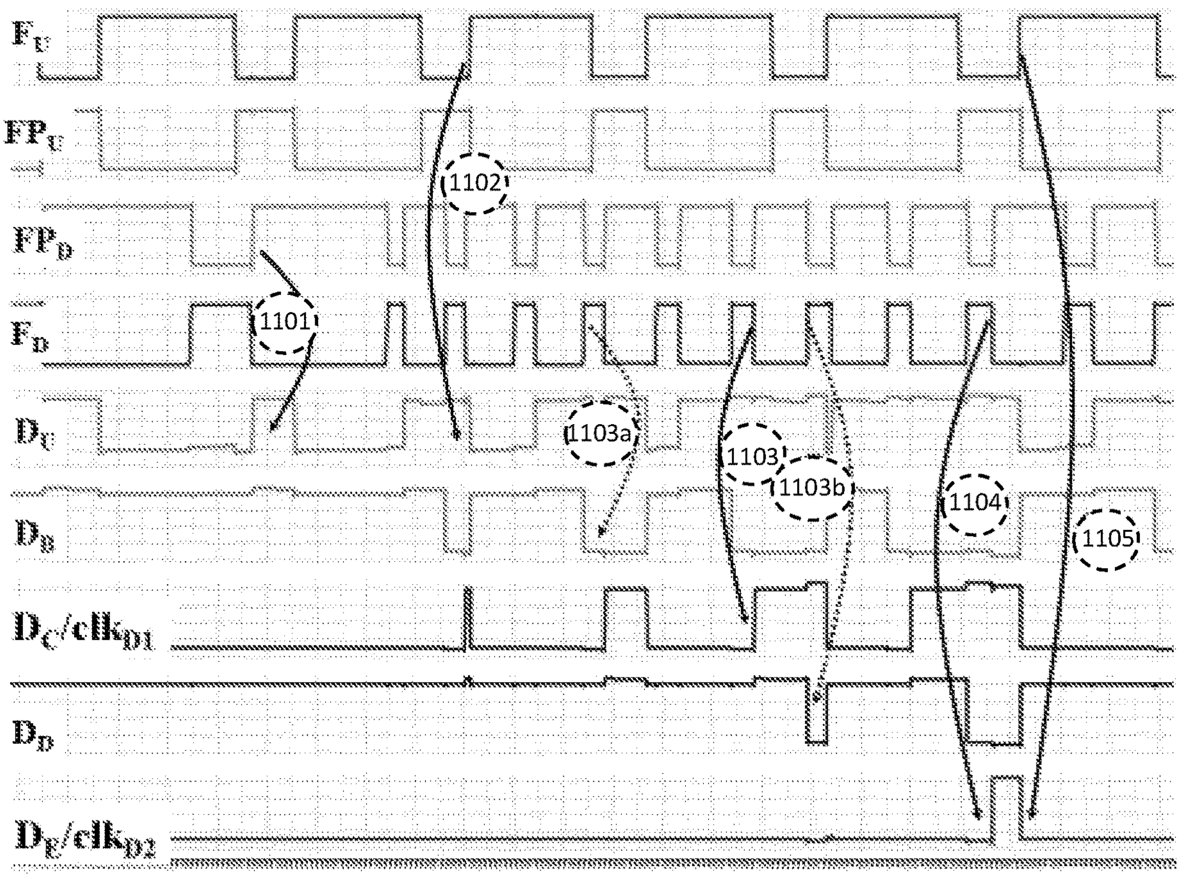
FIG. 11 illustrating a timing diagram of the digital frequency comparator illustrated in FIG. 2 in accordance with embodiments of the invention whereby the timing diagram illustrates the pulling down of a pair of pull-down resistors.

At step 305, as illustrated in FIG. 10, a falling edge is detected at the second digital signal $F_D$ (and signal $FP_D$ remains low as well for a period of time $T_1$) and this causes the voltage at detector node $D_U$ to become high. As the voltage at detector node $D_U$ becomes high, it causes the voltage level at node $U_D$ to become low, which in turn triggers the voltage level at node $U_C$ to become high. This then in turn causes the voltage level at $U_D$ to become low and this causes the voltage level at node $U_E$ to become high. As a result, the voltage levels at output nodes $clk_{U1}$ and $clk_{U2}$ both become high.

For completeness, the timing diagrams of sub-circuits 205*b*, 210*b* and 215*b* when first and second digital signals $F_U$ and $F_D$ are provided to these sub-circuits will be discussed in FIGS. 11-18. In particular, this timing diagram provides an overview of the key events/steps 1101-1105 that occur in these sub-circuits.

Figure 12:
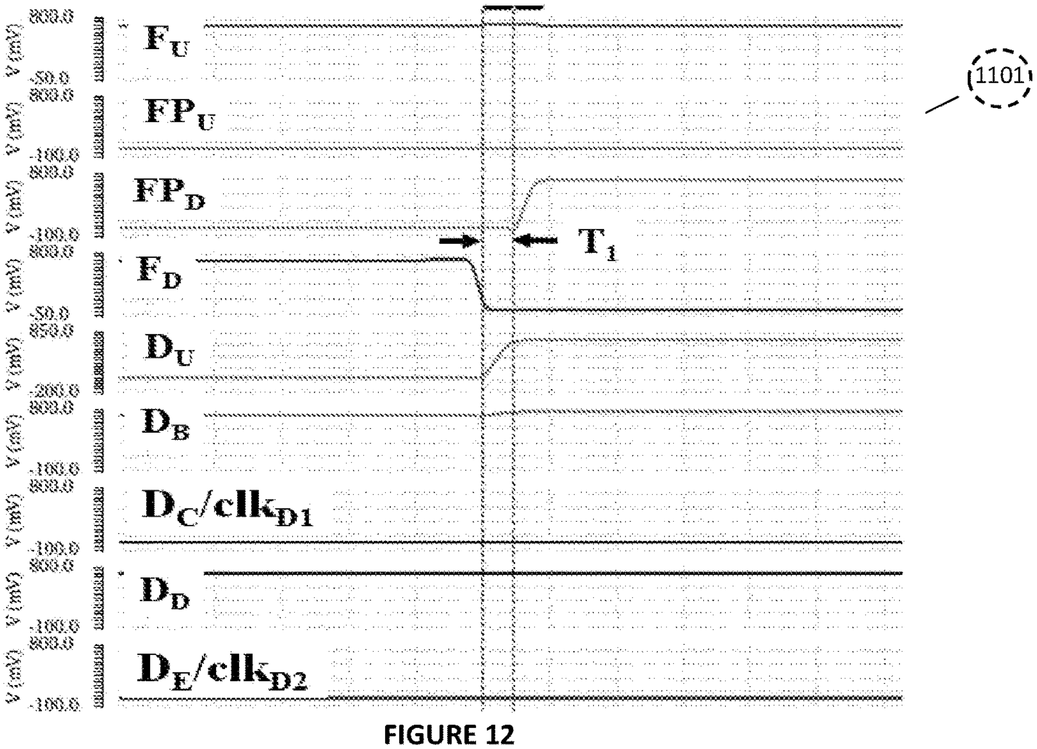
FIG. 12 illustrating a timing diagram of the digital frequency comparator illustrated in FIG. 2 at step 1101 of the timing diagram in FIG. 11 in accordance with embodiments of the invention.

At step 1101, as illustrated in FIG. 12, a delay of period $T_1$ exists between the second digital signal $F_D$ and the inverted delayed-second digital signal $FP_D$. Due to this delay, after a falling edge occurs for signal $F_D$, the signal $FP_D$ only starts falling after the period $T_1$ has lapsed. During this period $T_1$, as both signals $F_D$ and $FP_D$ are "low", this causes PMOS transistors $M_{PD1}$ and $M_{PD2}$ to switch on and as the first digital signal $F_U$ is "high", this causes one of NMOS transistors $M_{NU1}$ and $M_{NU2}$ to switch off. As a result, the voltage at detector node $D_U$ is triggered to become high.

Figure 13:
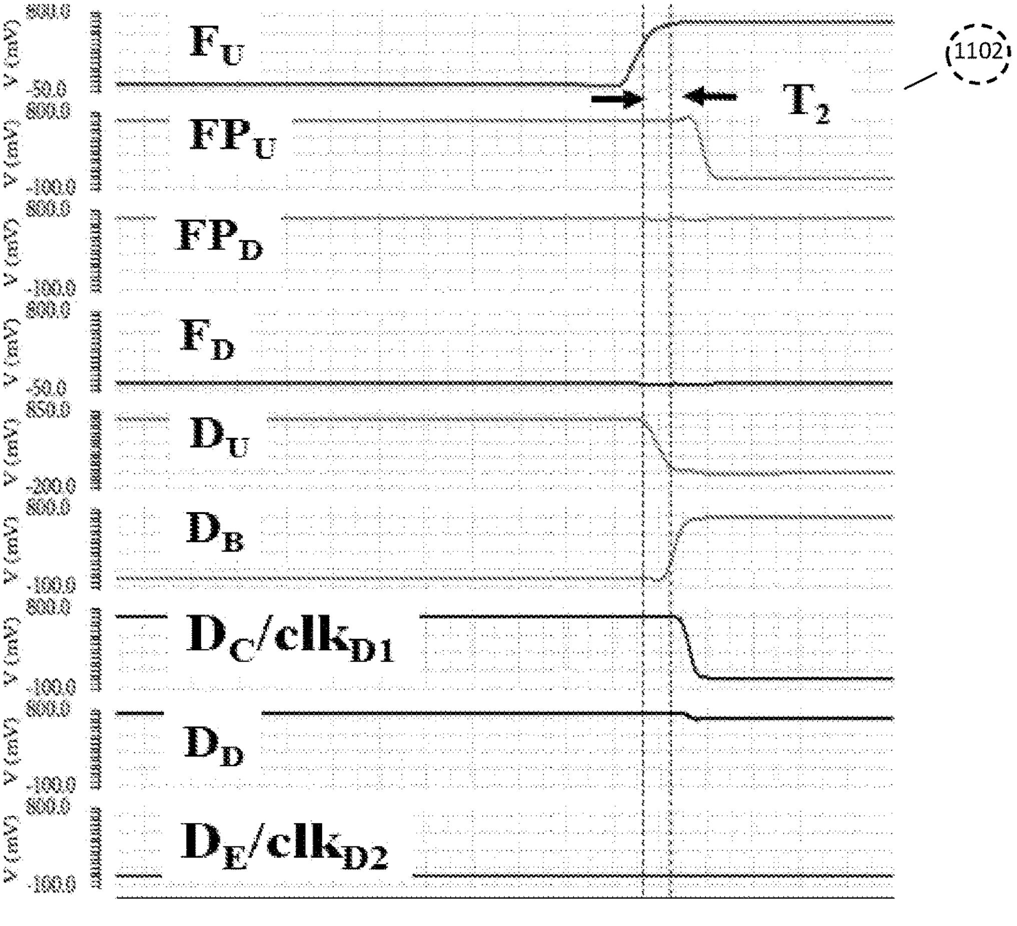
FIG. 13 illustrating a timing diagram of the digital frequency comparator illustrated in FIG. 2 at step 1102 of the timing diagram in FIG. 11 in accordance with embodiments of the invention.

At step 1102, as illustrated in FIG. 13, it can be seen that a delay of period $T_2$ similarly exists between the first digital signal $F_U$ and the inverted delayed-second digital signal $FP_U$. Due to this delay, after a rising edge occurs for signal $F_U$, the signal $FP_U$ only starts falling after the period $T_2$ has lapsed. During this period $T_2$, as both signals $F_U$ and $FP_U$ are "high", this causes NMOS transistors $M_{NU1}$ and $M_{NU2}$ to switch on and as the second digital signal $F_D$ is "low", this causes one of PMOS transistors $M_{PD1}$ and $M_{PD2}$ to switch off.

As a result, the voltage at detector node $D_U$ is triggered to become low.

Figure 14:
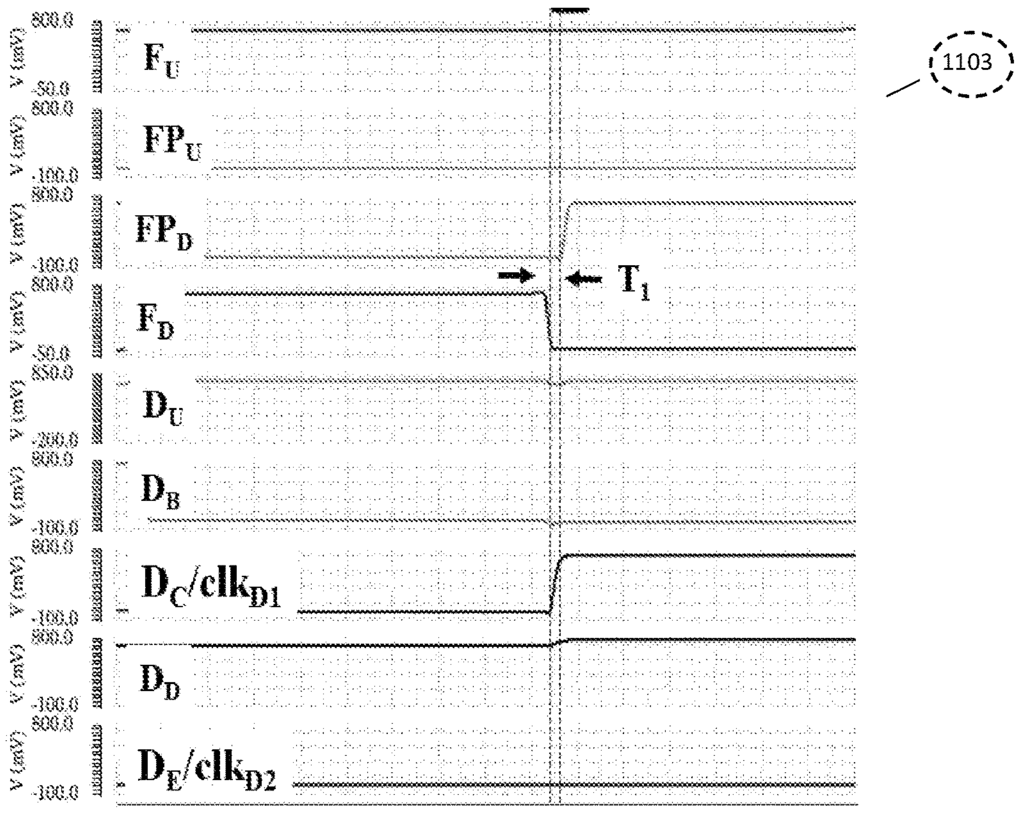
FIG. 14 illustrating a timing diagram of the digital frequency comparator illustrated in FIG. 2 at step 1103 of the timing diagram in FIG. 11 in accordance with embodiments of the invention.

After step 1102, at step 1103, a first falling edge occurs at digital signal $F_D$ causing detector node $D_U$ to become high. This is shown in FIG. 14. This triggering action in turn switches NMOS transistor $M_{ND1}$ on.

Figure 15:
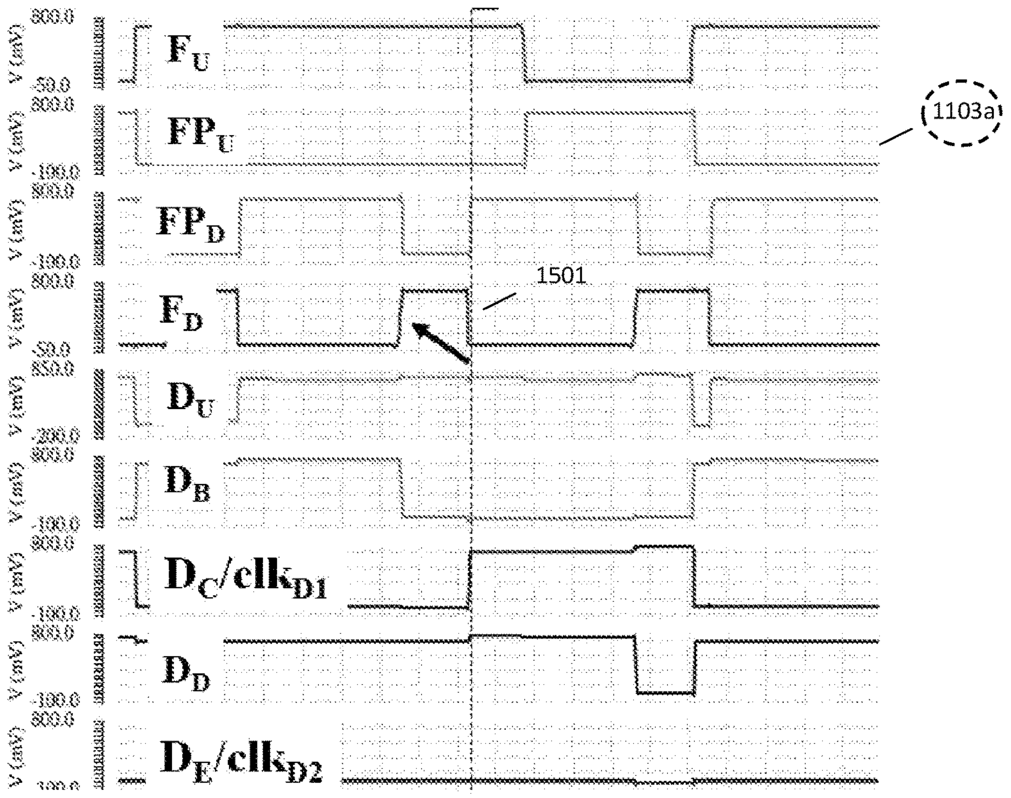
FIG. 15 illustrating a timing diagram of the digital frequency comparator illustrated in FIG. 2 at step 1103*a* of the timing diagram in FIG. 11 in accordance with embodiments of the invention.

At step 1103*a*, as illustrated in FIG. 15, when signal $F_D$ becomes high and when signal $FP_D$ is high as well for a period of $T_1$, this causes a voltage level at node $D_B$ to become low.

Subsequently, at a second falling edge 1501 of digital signal $F_D$, the voltage level at node $D_C$ becomes high, which in turn after being processed by inverters and a level shifter, causes a voltage level at output node $clk_{D1}$ to become high as well.

Figure 16:
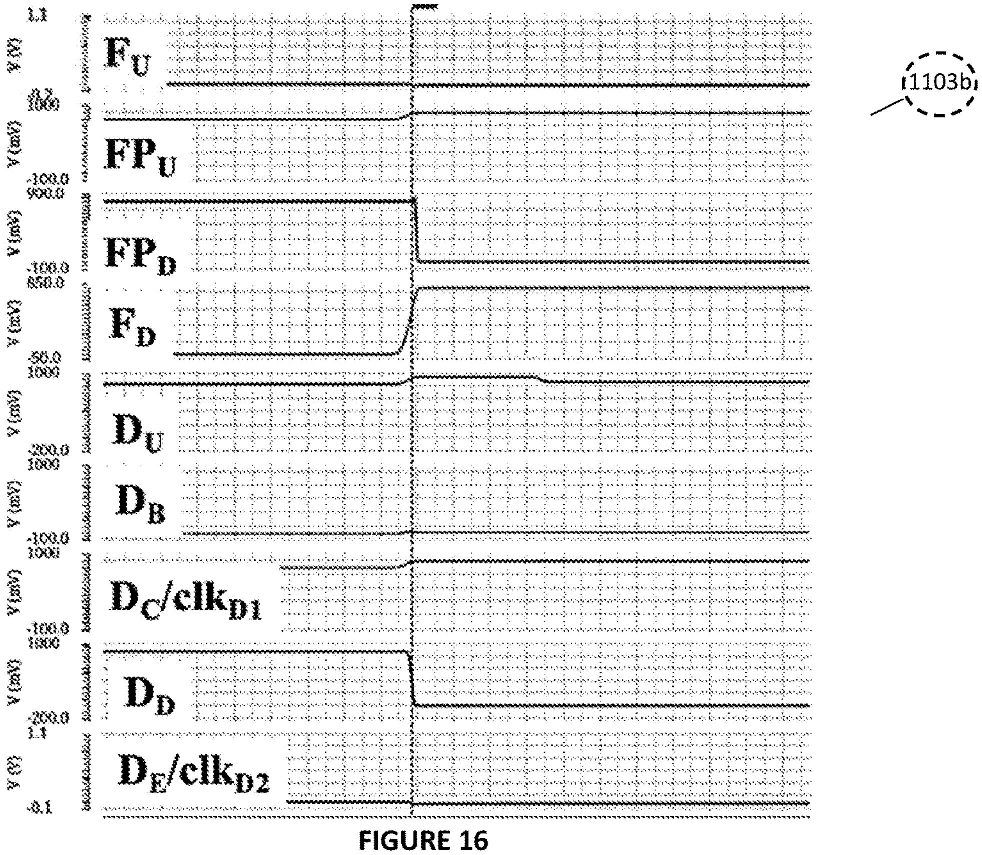
FIG. 16 illustrating a timing diagram of the digital frequency comparator illustrated in FIG. 2 at step 1103*b* of the timing diagram in FIG. 11 in accordance with embodiments of the invention.

As a rising edge is not detected at the first digital signal $F_U$, when the signal $F_D$ becomes high, this causes the voltage at node $D_D$ to become low. This takes place at step 1103*b* as illustrated in FIG. 16.

Figure 17:
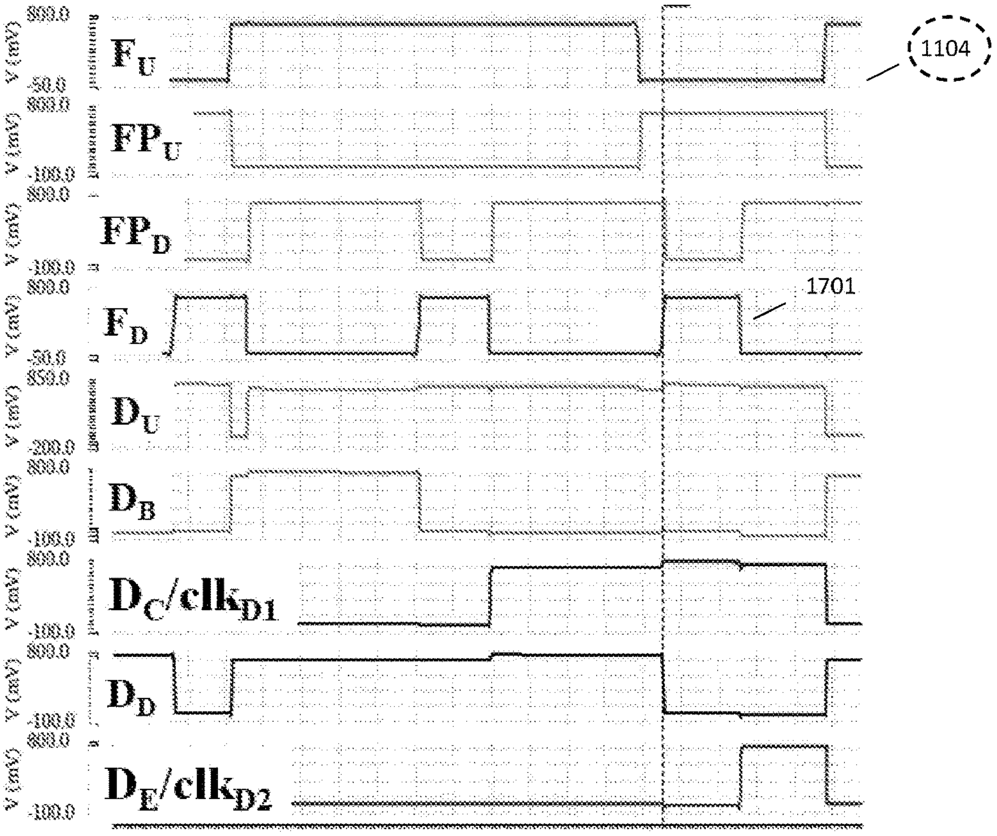
FIG. 17 illustrating a timing diagram of the digital frequency comparator illustrated in FIG. 2 at step 1104 of the timing diagram in FIG. 11 in accordance with embodiments of the invention.

Subsequently, as illustrated in FIG. 17, a third falling edge 1701 occurs for digital signal $F_D$ at step 1104. This causes the voltage level at node $D_E$ to become high as PMOS transistors $M_{PD8}$, $M_{PD9}$, and $M_{10}$ are switched on. After the voltage level at node $D_E$ has been processed by inverters and a level shifter, this causes a voltage level at output node $clk_{D2}$ to become high as well.

Figure 18:
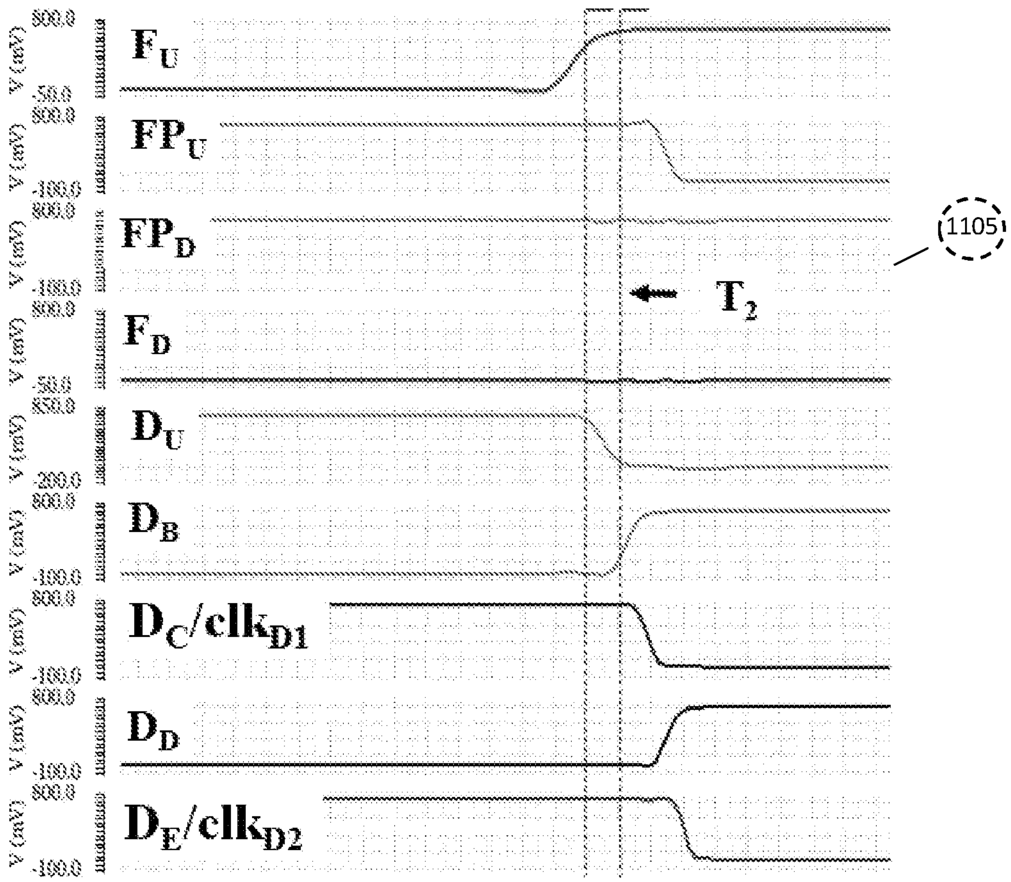
FIG. 18 illustrating a timing diagram of the digital frequency comparator illustrated in FIG. 2 at step 1105 of the timing diagram in FIG. 11 in accordance with embodiments of the invention.

At step 1105, as illustrated in FIG. 18, a rising edge is detected at the first digital signal $F_U$ and this causes the voltage at detector node $D_U$ to become low. As the voltage at detector node $D_U$ becomes low, it causes the voltage level at node $D_R$ to become high, which in turn triggers the voltage level at node $D_C$ to become low. This then in turn causes the voltage level at $D_D$ to become high and this causes the voltage level at node $D_E$ to become low. As a result, the voltage levels at output nodes $clk_{D1}$ and $clk_{D2}$ both become low.

Hence, as illustrated in the timing diagrams in FIGS. 3-18, sub-circuits 205*a/b*, 210*a/b*, and 215*a/b* may be used to pull up the pair of pull-up resistors $R_{U1}$ and $R_{U2}$ and to pull down the pair of pull-down resistors $R_{D1}$ and $R_{D2}$ when certain signals are received by these sub-circuits.

Figure 19:
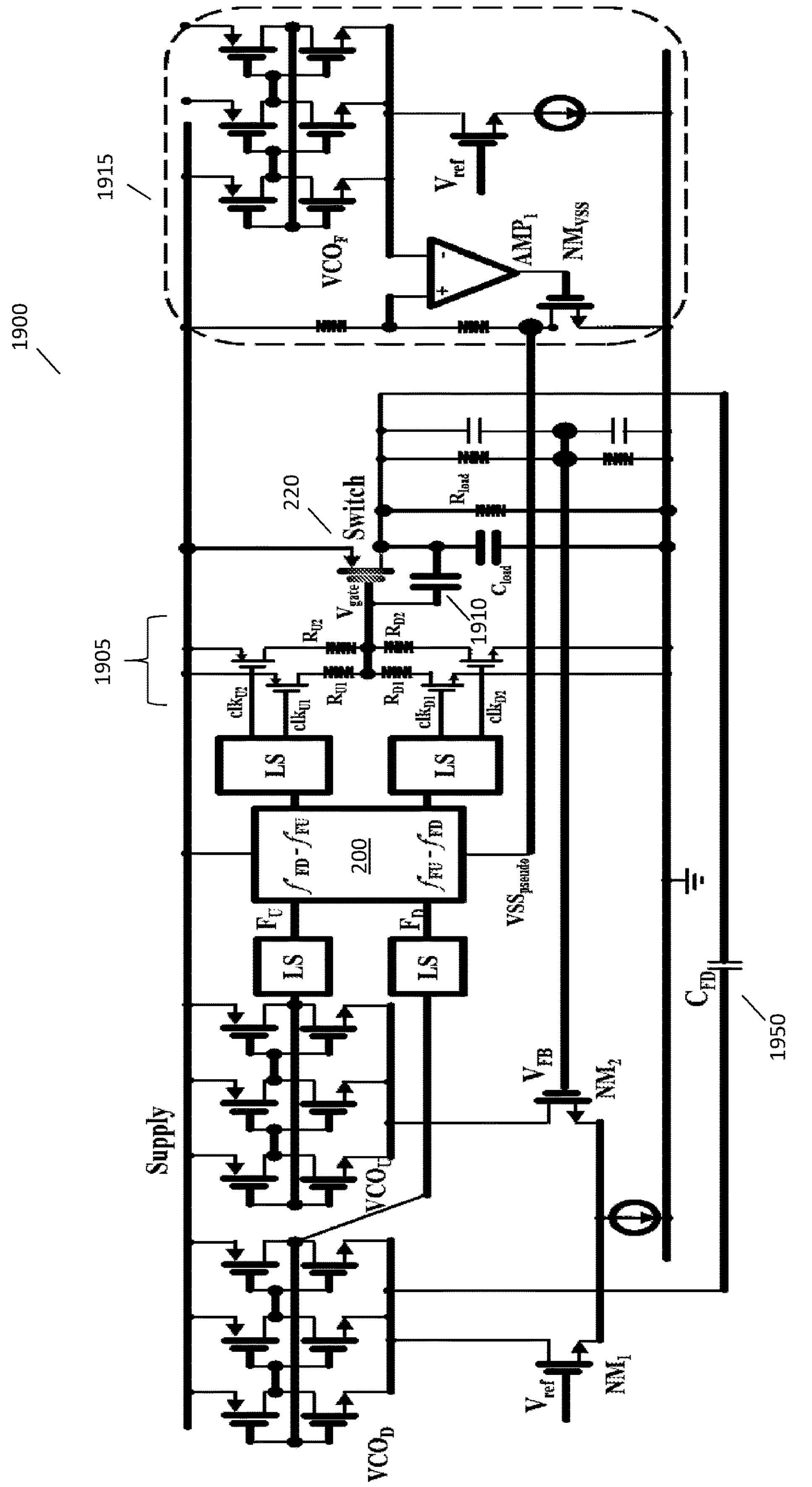
FIG. 19 illustrating circuit diagram of an LDO regulator in accordance with embodiments of the invention.

FIG. 19 illustrates a circuit diagram of hybrid LDO regulator 1900 that includes digital comparator 200, 3-stage inverter ring oscillators (VCOs) $VCO_D$ and $VCO_U$, a push-pull resistor array 1905, amplifier 220 and $VSS_{pseudo\_bias}$ comparator circuit 1915.

In embodiments of the invention, the VCOs $VCO_D$ and $VCO_U$ are configured to generate clocks with frequencies that are proportional to the differential voltage inputs. As illustrated in FIG. 19, a pair of common source NMOS transistors, $NM_1$ and $NM_2$ are utilized to set the tail currents of two subthreshold inverter ring oscillators, $VCO_D$ and $VCO_U$. In embodiments of the invention, through simulation, it was found that these VCOs were able to generate 15 MHz oscillating clock signals with oscillating amplitudes between 0.55 V and 0.35 V while drawing only 20 nA of current when a 0.55 V voltage supply was used.

Two digital clock signals, $F_U$ and $F_D$, are provided to comparator 200 by VCOs $VCO_D$ and $VCO_U$, whereby rising/falling edge sequence information of the digital clock signals, $F_U$ and $F_D$ are extracted by comparator 200 and used to control a push-pull resistor array to control the gate voltage of amplifier 220.

In order to reduce the amount of power consumed by the hybrid-LDO, digital comparator 200's supply voltage $VSS_{pseudo}$ is controlled by $VSS_{pseudo\_bias}$ comparator circuit 1915 to ensure that sure that digital comparator 200's voltage drop is no more than 3-times (3×) of the mentioned oscillating amplitude, and does not constitute the whole supply. Another ring oscillator, $VCO_F$, which is identical to VCOs $VCO_U$ and $VCO_D$, is added to circuit 1915 to provide a reference voltage to differential amplifier $AMP_1$. Differential amplifier $AMP_1$ is configured to control NMOS switch $NM_{VSS}$ such that the current drawn by comparator 200 may be adjusted to ensure that a specific voltage drop exists in comparator 200 between its supply voltage and pseudo supply voltage. When LDO 1900 is in a stable state, digital clock signals $F_U$ and $F_0$ would be almost the same and as a result, LDO 1900 would consume ultra-low power. This means that when LDO 1900 is in a stable state, the push-pull resistor array would be totally OFF and only the differential VCOs and comparator 200 would be active.

In order to ensure that hybrid-LDO 1900 has a stable transient response or a stable output voltage, the dominant pole at its output is maintained at the gate node of amplifier 220 by a Miller capacitor $C_{Miller}$, 1910 (which is connected between the gate node and the output node of amplifier 220). The use of capacitor 1910 also improves the LDO's transient response as changes to its output voltage would be coupled to amplifier 220's gate. For example, when the output voltage of amplifier 220 increases, $C_{Miller}$ 1910 pulls up the voltage at the $V_{gate}$ node simultaneously, which in turn reduces the current flowing through amplifier 220. This feedback loop compensates for voltage changes at the output of amplifier 220 and this helps to stabilize the output voltage. To further enhance the transient response of the hybrid-LDO, a feedforward capacitor $C_{FD}$ 1950 is added to speed up the VCO's frequency response time. When the output voltage of amplifier 220 changes, $C_{FD}$ 1950 feed forwards the voltage change to $VCO_D$ and causes signal $F_D$ to change accordingly. Without $C_{FD}$ 1950, the output voltage of amplifier 220 will affect the voltage of $V_{FB}$ which in turn controls the voltage at $VCO_U$. When this happens, signal $F_U$ changes accordingly and in general, this takes a much longer time.

Figure 20:
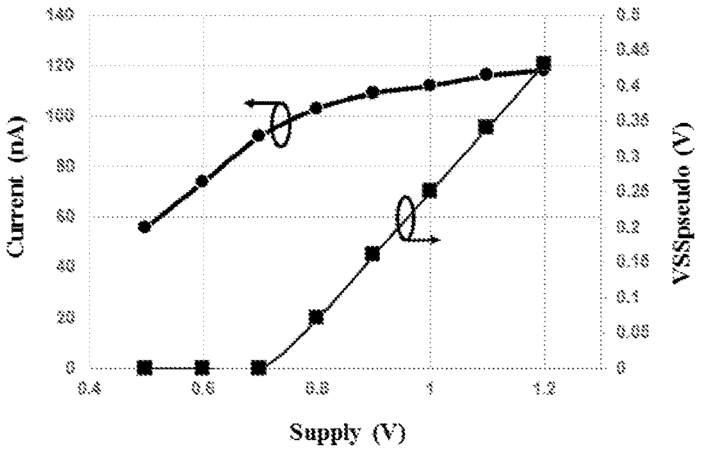
FIG. 20 illustrating the current consumption of the digital comparator illustrated in FIG. 2 in accordance with embodiments of the invention.

FIG. 20 illustrates a simulated plot of voltage $VSS_{pseudo}$ and the current consumed by comparator 200 vs. supply voltage $V_{supply}$ when comparator 200 is used in LDO 1900. It can be seen that the voltage drop between $VSS_{pseudo}$ and $V_{supply}$ is about 0.8 V when the supply voltage is more than 0.7 V.

Figure 21:
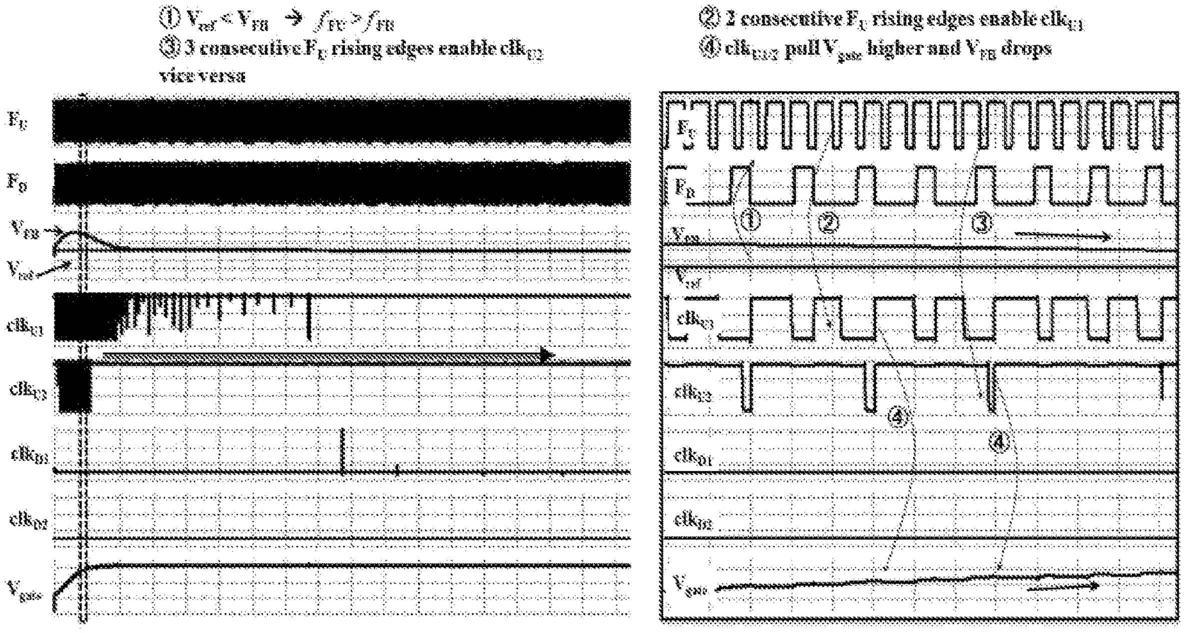
FIG. 21 illustrating the timing diagram of an LDO regulator in accordance with embodiments of the invention.

FIG. 21 shows the simulated waveforms of LDO 1900 from its start up when it's output deviates from a target voltage and the stable mode when the LDO has stabilized and its output is regulated. When $V_{FD}>V_{ref}$, the frequency of signal $F_U$ is higher than the frequency of signal $F_D$.

When two consecutive rising edges are detected at signal $F_U$ and when these two rising edges are located in between two $F_D$ falling edges, a pull-up resistor $R_{U1}$ that is connected to the gate of the PMOS gate will charge gate's voltage accordingly.

Further, if three consecutive rising edges are detected at signal $F_U$, a pull-up resistor $R_{U2}$ that is connected to the gate of the PMOS transistor's gate will charge the gate's voltage as well. Hence, when the voltage error at the LDO's output is small, only pull-up resistor $R_{U1}$ is required to discretely charge the gate voltage of the PMOS transistor, and the equivalent pole at the PMOS transistor's gate is suppressed at a low frequency. However, if the LDO is in transient response function mode, resistor $R_{U2}$ will also be connected to the gate of the PMOS transistor to charge its gate faster in order to reduce the LDO's settling time. In this way, the settling time is shortened and the LDO's stability is maintained.

When $V_{FB}<V_{ref}$, the frequency of signal $F_U$ is lower than the frequency of signal $F_D$ as such, resistors $R_D$, and $R_{D2}$ may then be used to pull down the voltage at the PMOS transistor's gate.

After a certain period of time has lapsed, the LDO's output voltage would have been regulated to the required value, as such, the frequencies of signals $F_U$ and $F_D$ would be almost the same, and output nodes $clk_{U1/2}$ and $clk_{D1/2}$ would be in their disabled states. Hence, only the VCOs and the digital comparator would be active, and as a result, the LDO consumes very low power.

Experimental Results

Figure 22:
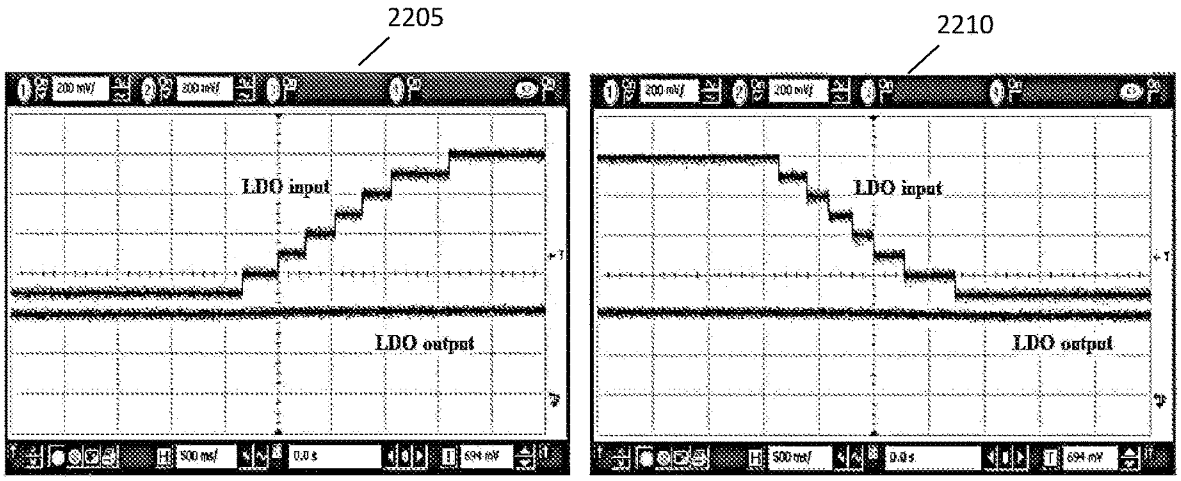
FIG. 22 illustrating the performance of the LDO regulator in accordance with embodiments of the invention.

In this experiment, LDO 1900 was fabricated using a 65 nm CMOS process, with 400 nA quiescent current and a 20 pF capacitor. FIG. 22 illustrates the performance of the simulated LDO whereby plot 2205 shows that the output of the LDO remains stable even though the input of the LDO gradually increases and plot 2210 shows that the output of the LDO remains stable even though the input of the LDO gradually decreased.

Figure 23A:
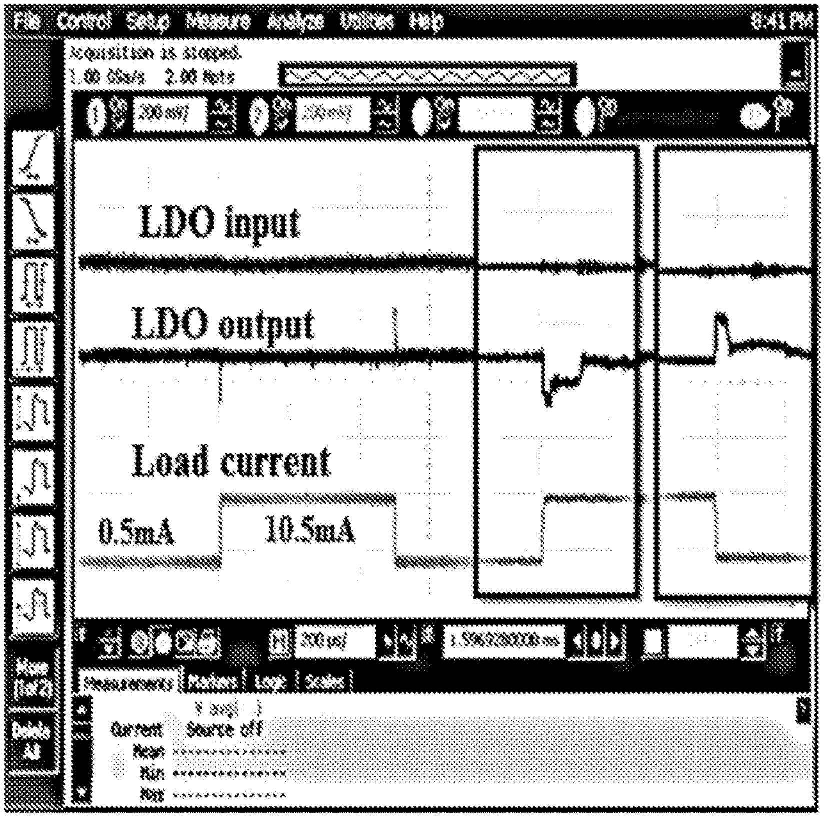
FIGS. 23A, 23B and 23C illustrating the transient response of the LDO regulator in accordance with embodiments of the invention.
Figure 23B:
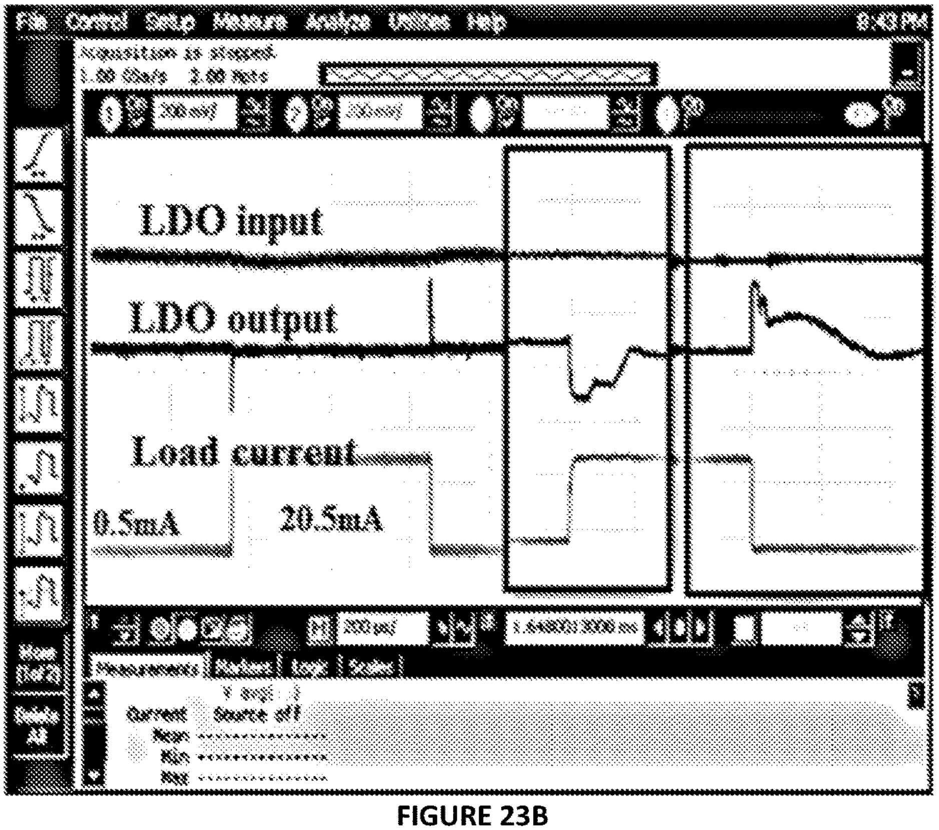
Figure 23C:
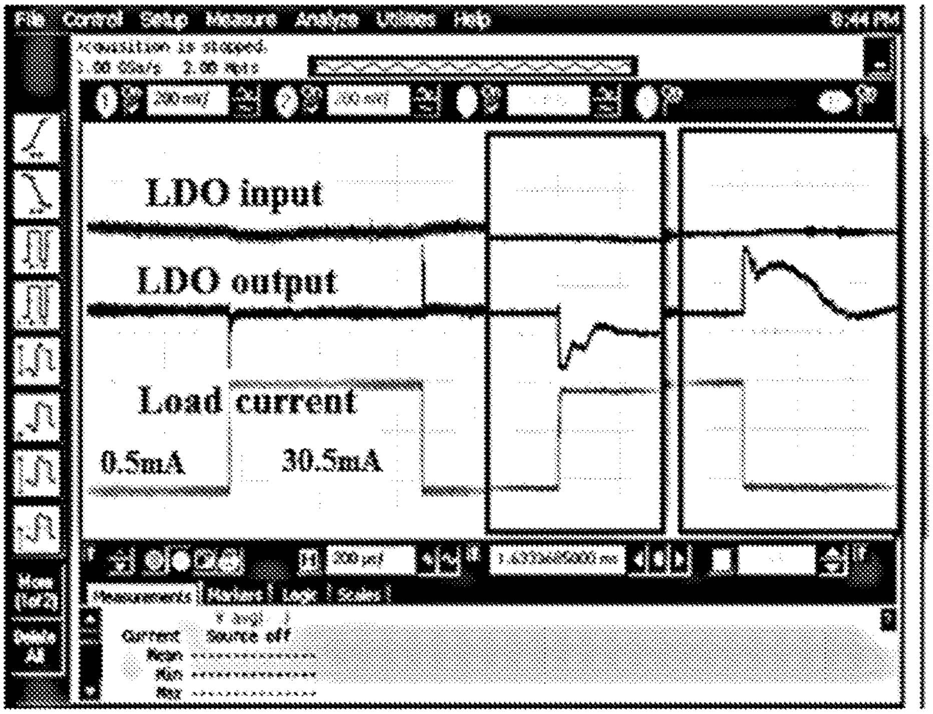

FIG. 23 illustrates the measured performance of the LDO's transient response when the current of the LDO $I_{load}$ is stepped from 0.5 mA to 10.5/20.5/30.5 mA, respectively and back to 0.5 mA with an edging time of 10 ns. As only a 10 pF load capacitor was used, 180/220/250 mV undershoot and 180/270/300 mV overshoot were achieved, respectively. The undershoot and the overshoot settling time was measured to be 0.5 μs and 6 μs, respectively. In particular, FIG. 23A illustrates the transient response of the LDO when the load current shifts between 0.5 mA and 10.5 mA; FIG. 23B illustrates the transient response of the LDO when the load current shifts between 0.5 mA and 20.5 mA; and FIG. 23C illustrates the transient response of the LDO when the load current shifts between 0.5 mA and 30.5 mA.

The DC characteristics of the LDO are summarized in Table 1 below whereby the line regulation and load regulation were measured to be 2.5 mV/V and 0.5 mV/mA, respectively. When the load current was at 630 nA, a larger than 99.9% current efficiency was achieved in 10 mA load regulation current.

TABLE 1

| 450 mV output | Quiescent current | Load regulation (0~10 mA) | Line regulation (0.6 V~1.2 V, 10 mA load) |
|---|---|---|---|
| TYP, 25 degree | 633 nA | 500 µV/mA | 2.5 mV/V |
| SS, 0 degree | 660 nA | 470 µV/mA | 4.2 mV/V |
| FF, 50 degree | 608 nA | 1.3 mV/mA | 10 mV/V |

The performance of an LDO designed in accordance with embodiments of the invention is compared against other designs known in the art in Table 2 below. Table 2 shows that with 400 nA quiescent current and a 0.5V supply, a 1,000,000× load dynamic range and a 0.004 ps Figure of Merit (FOM) was achievable with the lowest quiescent current, largest load dynamic range and smallest on-chip capacitor compared to other state-of-art digital/hybrid control LDOs. For FOM comparisons, the proposed LDO in 65 nm technology achieved 2 orders of better performance than the LDOs designed using the 40 nm and 65 nm processes and even has a better value than the one designed using the 28 nm process (which is a more matured process and should have power and speed advantages when FOM calculation is performed).

TABLE 2

| | This work | [4] Tsou, 2017 ISSCC | [1] Huang, 2017 ISSCC | [5] Salem, 2017 ISSCC | [7] Yang, 2017 ISSCC | [2] Ma, 2018 ISSCC | [3] Kundo, 2018 ISSCC | [6] Salem, 2018 ISSCC | Unit |
|---|---|---|---|---|---|---|---|---|---|
| Process Technology Type | 65 nm CMOS Hybrid | 40 nm CMOS digital | 65 nm CMOS Digital/ hybrid | 65 nm CMOS digital | 65 nm CMOS analog | 28 nm CMOS Digital/ hybrid | 65 nm CMOS digital | 65 nm CMOS hybrid | |
| Clk frequency | 15 (internal) | N.A. | 10 | 1-240 | No | 4/1 | N.A. | 0.1M-1.5 G | Mhz |
| Cap in total | 20 | 20nf | 100 | 400 | 40 | 24 | 40 | 365 | pf |
| Input range | 0.5-1.2 | 0.6-1.1 | 0.5-1.0 | 0.5-1.0 | 0.6 | 0.4-0.55 | 0.6-1.2 | 0.3-0.9 | V |
| Output range | 0.45-1.15 | 0.5-1.0 | 0.45-0.35 | 0.3-0.45 | 0.3-0.55 | 0.35-0.5 | 0.4-1.1 | 0.3-0.8 | V |
| Load dynamic range | 50 nA-50 mA* 1,000,000X | N.A. | 584X | 20,000X | 1 uA-50 mA 50,000X | 552X | 1,024X | 300X | |
| Max load current | 30 | 210 | 12 | 2 | 50 | 20 | 100 | 3 | mA |
| Line regulation | 25.8 | N.A. | N.A. | 3.1 | N.A. | N.A. | N.A. | N.A. | mV/V |
| Load regulation | 1.3 | <0.075 | N.A. | 0.65 | N.A. | N.A. | N.A. | N.A. | mV/V |
| Quinscent Current | 0.3 | 22.6-98.5 | 3.2 | 14 | 32 | 0.81/0.43 | 100-1070 | 48.4 | µA |
| Transient response ΔVOUT ® $\Delta i_{load}$/edge time | 230 mV@ 10 mA/10 ns | 36 mV@ 200 mA/1 µs | 105 mV@ 10 mA/1 ns | 40 mV@ 1 mA/1 ns | 134 mV@ 10 mA/150 ns | 110 mV@ 15 mA/3 ns | 108 mV@ 50 mA/1.2 µs | 20.5 mV@ 3.3 mA/0.2 ns | |
| Settling time | 0.3 | 1.3 | 1.7 | 0.1 | 15 | 10 | 1.13 | 0.005 | µs |
| FOM | 0.0037 | 0.39 | 0.28 | 105.7 | 0.34 | 0.0051 | 1.38 | 34.3 | ps |

$FOM = (I_Q/I_{load\_max})*(\Delta VOUT/\Delta I_{load})*CAP$

*Current to resistor divider is 50 nA

The above is a description of embodiments of a system and method in accordance with the present invention as set forth in the following claims. It is envisioned that others may and will design alternatives that fall within the scope of the following claims.

The invention claimed is:

1. A digital comparator coupled to a pair of pull-up resistors and a pair of pull-down resistors whereby both pairs of resistors are coupled to a gate terminal of an output stage, the digital comparator comprising:

- a single-edge detector stage configured to detect a first rising edge in a received first digital signal, and to detect a first falling edge in a received second digital signal, whereby when the first rising edge is detected and when the first falling edge is not simultaneously detected, a detector node is set to a low voltage level, and when the first falling edge is detected, the detector node is set to a high voltage level;
- a consecutive two-edge detector stage coupled to the single-edge detector stage, the consecutive two-edge detector stage configured to detect a voltage level of the detector node, a consecutive second rising edge in the received first digital signal and a consecutive second falling edge in the received second digital signal,
  - whereby when the consecutive second rising edge is detected and when the voltage level of the detector node is simultaneously detected to be at the low voltage level, the consecutive two-edge detector stage causes one of the pair of pull-up resistors to pull up a voltage at the gate terminal, and
  - when the consecutive second falling edge is detected and when the voltage level of the detector node is simultaneously detected to be at the high voltage level, the consecutive two-edge detector stage causes one of the pair of pull-down resistors to pull down the voltage at the gate terminal;
- a consecutive three-edge detector stage coupled to the single-edge and the consecutive two-edge detector stages, the consecutive three-edge detector stage configured to detect the voltage level of the detector node, a consecutive third rising edge in the received first digital signal and a consecutive third falling edge in the received second digital signal,
  - whereby when the consecutive third rising edge is detected and when the voltage level of the detector node is simultaneously detected to be at the low voltage level, the consecutive three-edge detector stage causes the other one of the pair of pull-up resistors to pull up the voltage at the gate terminal, and
  - when the consecutive third falling edge is detected and when the voltage level of the detector node is simultaneously detected to be at the high voltage level, the consecutive three-edge detector stage causes the other one of the pair of pull-down resistors to pull down the voltage at the gate terminal.

2. The digital comparator according to claim 1, whereby when the consecutive two-edge detector stage and the consecutive three-edge detector stage detect a high voltage level at the detector node, the consecutive two-edge and three-edge detector stages cause the pair of pull-up resistors to be disabled.

3. The digital comparator according to claim 1, whereby when the consecutive two-edge detector stage and the consecutive three-edge detector stage detect a low voltage level at the detector node, the consecutive two-edge and three-edge detector stages cause the pair of pull-down resistors to be disabled.

4. The digital comparator according to claim 1, wherein level shifters are provided at inputs of the single-edge detector stage, at outputs of the consecutive two-edge detector stage and at outputs of the consecutive three-edge detector stage.

5. A digital low-dropout circuit having the digital comparator according to claim 1, the digital low-dropout circuit using the output stage to generate a stable output voltage, the digital low-dropout circuit comprising:

a first inverter ring oscillator that is controllable by an output voltage of the output stage to generate the first digital signal; and a second inverter ring oscillator that is controllable by a reference voltage to generate the second digital signal.

6. The digital low-dropout circuit according to claim 5, wherein a sub-digital comparator is provided to control a pseudo-voltage of the digital comparator.

7. The digital low-dropout circuit according to claim 6, whereby the sub-digital comparator comprises:

a differential amplifier having a first input coupled to a voltage divider and a second input coupled to a third inverter ring oscillator that is controllable by the reference voltage.

8. The digital low-dropout circuit according to claim 5, wherein a Miller capacitor is provided between the gate terminal and an output node of the output stage.

9. The digital low-dropout circuit according to claim 5, wherein a feed-forward capacitor is provided between an output node of the output stage and an input of the second inverter ring oscillator.

10. A method of controlling a digital comparator that is coupled to a pair of pull-up resistors and a pair of pull-down resistors whereby both pairs of resistors are coupled to a gate terminal of an output stage, the method comprising:

detecting, using a single-edge detector stage, a first rising edge in a received first digital signal, and a first falling edge in a received second digital signal, whereby when the first rising edge is detected and when the first falling edge is not simultaneously detected, setting a detector node to a low voltage level, and when the first falling edge is detected, setting the detector node to a high voltage level;

detecting, using a consecutive two-edge detector stage coupled to the single-edge detector stage, a voltage level of the detector node, a consecutive second rising edge in the received first digital signal and a consecutive second falling edge in the received second digital signal, whereby when the consecutive second rising edge is detected and when the voltage level of the detector node is simultaneously detected to be at the low voltage level, causing one of the pair of pull-up resistors to pull up a voltage at the gate terminal, and when the consecutive second falling edge is detected and when the voltage level of the detector node is simultaneously detected to be at the high voltage level, causing one of the pair of pull-down resistors to pull down the voltage at the gate terminal;

detecting, a consecutive three-edge detector stage coupled to the single-edge and the consecutive two-edge detector stages, the voltage level of the detector node, a consecutive third rising edge in the received first digital signal and a consecutive third falling edge in the received second digital signal, whereby when the consecutive third rising edge is detected and when the voltage level of the detector node is simultaneously detected to be at the low voltage level, causing the other one of the pair of pull-up resistors to pull up the voltage at the gate terminal, and when the consecutive third falling edge is detected and when the voltage level of the detector node is simultaneously detected to be at the high voltage level, causing the other one of the pair of pull-down resistors to pull down the voltage at the gate terminal.

11. The method according to claim 10, whereby when the consecutive two-edge detector stage and the consecutive three-edge detector stage detect a high voltage level at the detector node, the method comprises a step of causing the pair of pull-up resistors to be disabled.

12. The method according to claim 10, whereby when the consecutive two-edge detector stage and the consecutive three-edge detector stage detect a low voltage level at the detector node, the method comprises a step of causing the pair of pull-down resistors to be disabled.

13. The method according to claim 10, wherein level shifters are provided at inputs of the single-edge detector stage, at outputs of the consecutive two-edge detector and at outputs of the consecutive three-edge detector stage.

* * * * *